(12) United States Patent
Widmer et al.

(10) Patent No.: US 10,361,591 B2
(45) Date of Patent: Jul. 23, 2019

(54) INDUCTIVE POWER TRANSFER COILS WITH PARASITIC RESONATORS

(71) Applicant: WiTricity Corporation, Watertown, MA (US)

(72) Inventors: Hans Peter Widmer, Wohlenschwil (CH); Markus Bittner, Sarmenstorf (CH)

(73) Assignee: WiTricity Corporation, Watertown, MA (US)

( * ) Notice: Subject to any disclaimer, the term of this patent is extended or adjusted under 35 U.S.C. 154(b) by 139 days.

(21) Appl. No.: 15/599,514

(22) Filed: May 19, 2017

(65) Prior Publication Data

US 2018/0334050 A1    Nov. 22, 2018

(51) Int. Cl.
| | |
|---|---|
| *H02J 7/00* | (2006.01) |
| *H02J 50/12* | (2016.01) |
| *B60L 53/12* | (2019.01) |
| *B60L 53/38* | (2019.01) |
| *B60L 53/30* | (2019.01) |
| *B60L 53/66* | (2019.01) |

(52) U.S. Cl.
CPC ............ *H02J 50/12* (2016.02); *B60L 53/12* (2019.02); *B60L 53/305* (2019.02); *B60L 53/38* (2019.02); *B60L 53/66* (2019.02)

(58) Field of Classification Search
CPC ...................................................... H02J 50/12
USPC .......................................................... 320/109
See application file for complete search history.

(56) References Cited

U.S. PATENT DOCUMENTS

| | | | |
|---|---|---|---|
| 2012/0161696 A1 | 6/2012 | Cook et al. | |
| 2013/0199027 A1* | 8/2013 | Singh | H02J 17/00 |
| | | | 29/602.1 |
| 2013/0199028 A1* | 8/2013 | Singh | A61N 1/0553 |
| | | | 29/602.1 |
| 2013/0205582 A1* | 8/2013 | Singh | H01F 41/00 |
| | | | 29/602.1 |
| 2014/0125140 A1 | 5/2014 | Widmer et al. | |
| 2014/0239729 A1* | 8/2014 | Covic | H02J 17/00 |
| | | | 307/104 |
| 2015/0094887 A1 | 4/2015 | Kawashima et al. | |

(Continued)

FOREIGN PATENT DOCUMENTS

WO        2016039644 A2        3/2016

OTHER PUBLICATIONS

Gu et al., "A New Method to Regulate Resonant Converters," IEEE Transactions on Power Electronics, vol. 3, No. 4, Oct. 1988, pp. 430-439.

(Continued)

*Primary Examiner* — Suchin Parihar
(74) *Attorney, Agent, or Firm* — Hunter Clark PLLC

(57) ABSTRACT

Techniques for wireless power charging of chargeable devices such as electric vehicles are provided. An example of a wireless power transmitting apparatus according to the disclosure includes a first coil structure, at least one second coil structure disposed adjacent to the first coil structure, and a transmitter operably and electrically connected to the first coil structure, such that the transmitter is configured to provide an electrical signal to the first coil structure and such that the at least one second coil structure is a parasitic coil structure and such that at least one of the first and the at least one second coil structure is a double-D coil structure.

30 Claims, 12 Drawing Sheets

(56) References Cited

U.S. PATENT DOCUMENTS

| | | |
|---|---|---|
| 2015/0318900 A1 | 11/2015 | Shimokawa et al. |
| 2016/0049232 A1 | 2/2016 | Covic et al. |
| 2016/0380469 A1* | 12/2016 | Lethellier ............... H02J 7/025 |
| | | 320/108 |
| 2017/0282724 A1* | 10/2017 | Krammer .............. B60L 11/182 |
| 2018/0131242 A1* | 5/2018 | Louis ...................... H02J 50/80 |
| 2018/0233961 A1* | 8/2018 | Hu .......................... H01F 27/38 |
| 2018/0272876 A1* | 9/2018 | Koenig ................. B60L 11/182 |

OTHER PUBLICATIONS

Moon S.C., "Wireless Power Transfer System With an Asymmetric Four-Coil Resonator for Electric Vehicle Battery Chargers", IEEE Transactions on Power Electronics, vol. 31, No. 10, Oct. 2016, pp. 6844-6854.

* cited by examiner

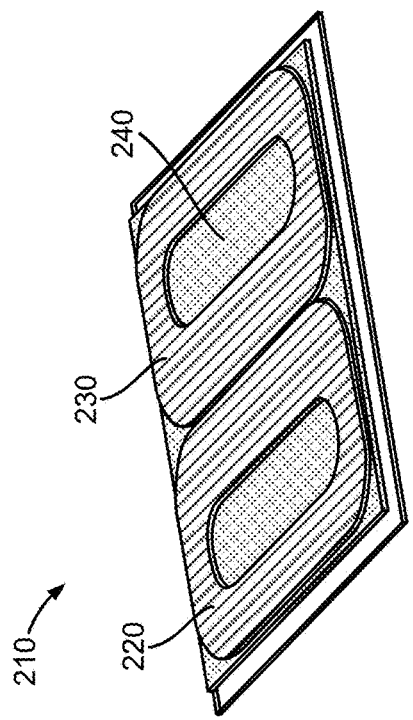
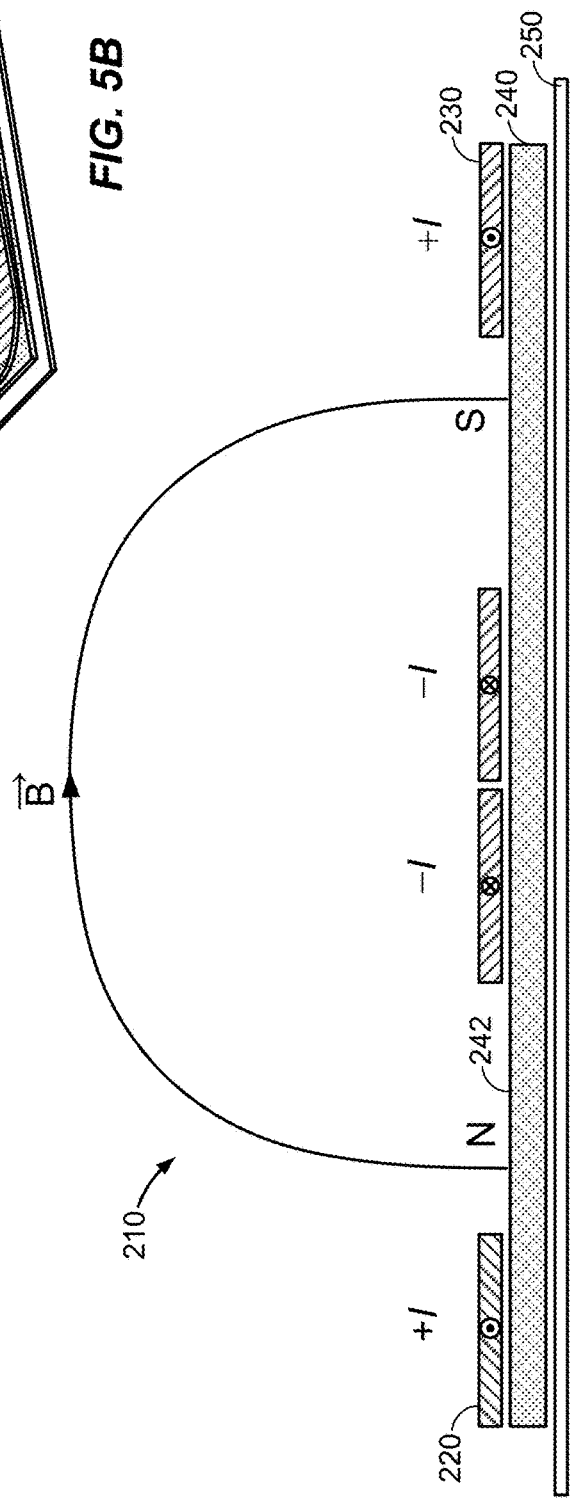
FIG. 5B
FIG. 5A
PRIOR ART

INDUCTIVE POWER TRANSFER COILS WITH PARASITIC RESONATORS

FIELD

This application is generally related to wireless power charging of chargeable devices such as electric vehicles, and more specifically to systems and methods for improving interoperability between different coil topologies.

BACKGROUND

Chargeable systems, such as vehicles, have been introduced that include locomotion power derived from electricity received from an energy storage device such as a battery. Vehicles that are solely electric generally receive the electricity for charging the batteries from other sources. Battery electric vehicles are often proposed to be charged through some type of wireless charging system that is capable of transferring power in free space (e.g., via a wireless field). The wireless field may be generated by a base charging pad (e.g., installed in the ground) and received by a vehicle pad (e.g., installed on the vehicle). The charging efficiency for a base charging pad and an electric vehicle charging pad may be dependent on the configurations the pads. For example, differences in the configurations of the base charging pad and the electric vehicle charging pad may reduce the amount of power that can be transferred between the pads as well as limit the positional tolerance between the pads for effective charging operations.

SUMMARY

An example of a wireless power transmitting apparatus for powering or charging an electric vehicle according to the disclosure includes a first coil structure, at least one second coil structure disposed adjacent to the first coil structure, and a transmitter operably and electrically connected to the first coil structure, such that the transmitter is configured to provide an electrical signal to the first coil structure and such that the at least one second coil structure is a parasitic coil structure and such that at least one of the first and the at least one second coil structure is a double-D coil structure.

Implementations of such an apparatus may include one or more of the following features. The first coil structure may be a double-D coil. The at least one second coil structure may include a first circular coplanar parasitic coil disposed in a first area within the double-D coil, and a second circular coplanar parasitic coil disposed in a second area within the double-D coil. The first circular coplanar parasitic coil may be electrically coupled to a first capacitive element, and the second circular coplanar parasitic coil is electrically coupled to a second capacitive element. The at least one second coil structure may include a parasitic circular coil disposed around and coplanar with the double-D coil. The parasitic circular coil may be electrically coupled to a capacitive element. The first coil structure may include a circular coil and the at least one second coil structure may include a parasitic double-D coil, such that the circular coil is disposed around the parasitic double-D coil. The parasitic double-D coil may be electrically coupled to a capacitive element. The first coil structure includes a double-D coil and the at least one second coil structure includes a parasitic double-D coil, such that the parasitic double-D coil may be disposed a first area and a second area bounded by the first coil structure. The parasitic double-D coil may be electrically coupled to a capacitive element. The first coil structure and the at least one second coil structure may be planar coils. The first coil structure and the at least one second coil structure may be coplanar. The first coil structure and the at least one second coil structure may be disposed in different planes. The first coil structure may be disposed on a first planar mounting surface and the at least one second coil structure may be deposed on a second planar mounting surface, such that the first planar mounting surface and the second planar mounting surface are parallel. The first planar mounting surface and the second planar mounting surface may be mechanically adjustable and configured to allow a displacement between the first coil structure and the at least one second coil structure.

An example of a wireless power receiving apparatus according to the disclosure includes a first coil structure, at least one second coil structure disposed adjacent to the first coil structure, and a receiver operably and electrically connected to the first coil structure, such that the first coil structure and the receiver provide a resonant structure configured to wirelessly couple power via a field generated by a wireless power transmitting apparatus, and such that the at least one second coil structure is a parasitic coil structure and such that at least one of the first and the at least one second coil structure is a double-D coil structure.

Implementations of such an apparatus may include one or more of the following features. The first coil structure may be a double-D coil. The at least one second coil structure may include a first circular coplanar parasitic coil disposed in a first area within the double-D coil, and a second circular coplanar parasitic coil disposed in a second area within the double-D coil. The at least one second coil structure may include a parasitic circular coil disposed around and coplanar with the double-D coil. The first coil structure may include a circular coil and the at least one second coil structure may include a parasitic double-D coil, such that the circular coil is disposed around the parasitic double-D coil. The first coil structure may include a double-D coil and the at least one second coil structure may include a parasitic double-D coil, such that the parasitic double-D coil is disposed a first area and a second area bounded by the first coil structure. The first coil structure and the at least one second coil structure may be coplanar. The first coil structure and the at least one second coil structure may be disposed in different planes. The first coil structure may be disposed on a first planar mounting surface and the at least one second coil structure may be deposed on a second planar mounting surface, such that the first planar mounting surface and the second planar mounting surface are mechanically adjustable to allow a change in a relative position of the first coil structure and the at least one second coil structure.

An example of a base charging pad in a wireless power transmitting apparatus according to the disclosure includes a planar mounting surface, a transmitting coil structure disposed on the planar mounting surface, a side planar mounting assembly disposed parallel to the planar mounting surface, at least one parasitic coil structure disposed on the side planar mounting assembly, and a transmitter operably and electrically connected to the transmitting coil structure, such that the transmitter is configured to provide an electrical signal to the transmitting coil structure, such that at least one of the transmitting coil structure and the at least one parasitic coil structure are in a double-D configuration.

An example of a method for modifying a relative position of a parasitic coil in a wireless power transmitting apparatus according to the disclosure includes determining an electric vehicle charging pad configuration, positioning one or more parasitic coils relative to one or more active coils based on the electric vehicle charging pad configuration, determining a coupling coefficient, and modifying the relative position of the one or more parasitic coils or the one or more active coils based on the coupling coefficient.

Implementations of such a method may include one or more of the following features. Determining the electric vehicle charging pad configuration may include receiving an electric vehicle charging pad configuration information via a communication link. The electric vehicle charging pad configuration information may indicate a coil configuration. The electric vehicle charging pad configuration information may indicate an offset value. The one or more parasitic coils and the one or more active coils may be positioned parallel to one another.

Items and/or techniques described herein may provide one or more of the following capabilities, as well as other capabilities not mentioned. A double-D configuration base charging pad may include one or more parasitic coils that are inductively coupled with the active double-D coils. The parasitic coils may be coupled to one or more capacitive elements creating LC-resonators. The parasitic coils are passive and may need neither external connections nor switches. The parasitic coils may boost performance in weak coupling conditions. The at least one parasitic coil may improve interoperability e.g. between a double-D type base charging pad and a circular type electric vehicle charging pad. The at least one parasitic coil may be coplanar with the double-D coil. Various configurations of double-D and circular coils may be realized. Other capabilities may be provided and not every implementation according to the disclosure must provide any, let alone all, of the capabilities discussed. Further, it may be possible for an effect noted above to be achieved by means other than that noted, and a noted item/technique may not necessarily yield the noted effect.

BRIEF DESCRIPTION OF THE DRAWINGS

The above-mentioned aspects, as well as other features, aspects, and advantages of the present technology will now be described in connection with various implementations, with reference to the accompanying drawings. The illustrated implementations, however, are merely examples and are not intended to be limiting. Throughout the drawings, similar symbols typically identify similar components, unless context dictates otherwise. Note that the relative dimensions of the following figures may not be drawn to scale.

FIGS. 5A and 5B are schematic diagrams showing a cut view and a corresponding perspective view, respectively, of a prior art charging pad based on a double-D coil structure also indicating a line of magnetic flux.

DETAILED DESCRIPTION

In the following detailed description, reference is made to the accompanying drawings, which form a part of the present disclosure. The illustrative implementations described in the detailed description, drawings, and claims are not meant to be limiting. Other implementations may be utilized, and other changes may be made, without departing from the spirit or scope of the subject matter presented here. It will be readily understood that the aspects of the present disclosure, as generally described herein, and illustrated in the Figures, can be arranged, substituted, combined, and designed in a wide variety of different configurations, all of which are explicitly contemplated and form part of this disclosure.

Wirelessly transferring power may refer to transferring any form of energy associated with electric fields, magnetic fields, electromagnetic fields, or otherwise from a transmitter to a receiver without the use of physical electrical conductors (e.g., power may be transferred through free space). The transmitter provide an electrical signal to provide power output into a wireless field (e.g., a magnetic field) may be received, captured by, or coupled by a "receiving coil" to achieve power transfer. The receiving coil may be designed based on a form factor for a particular electric vehicle model, or may implement other design considerations to improve the mobility features of the receiving coil.

An electric vehicle is used herein to describe a remote system, an example of which is a vehicle that includes, as part of its locomotion capabilities, electrical power derived from a chargeable energy storage device (e.g., one or more rechargeable electrochemical cells or other type of battery). As non-limiting examples, some electric vehicles may be hybrid electric vehicles that include besides electric motors, a traditional combustion engine for direct locomotion or to charge the vehicle's battery. Other electric vehicles may draw all locomotion ability from electrical power. An electric vehicle is not limited to an automobile and may include motorcycles, carts, scooters, and the like. By way of example and not limitation, a remote system is described herein in the form of an electric vehicle (EV). Furthermore, other remote systems that may be at least partially powered using a chargeable energy storage device are also contemplated (e.g., electronic devices such as personal computing devices and the like).

Figure 1:
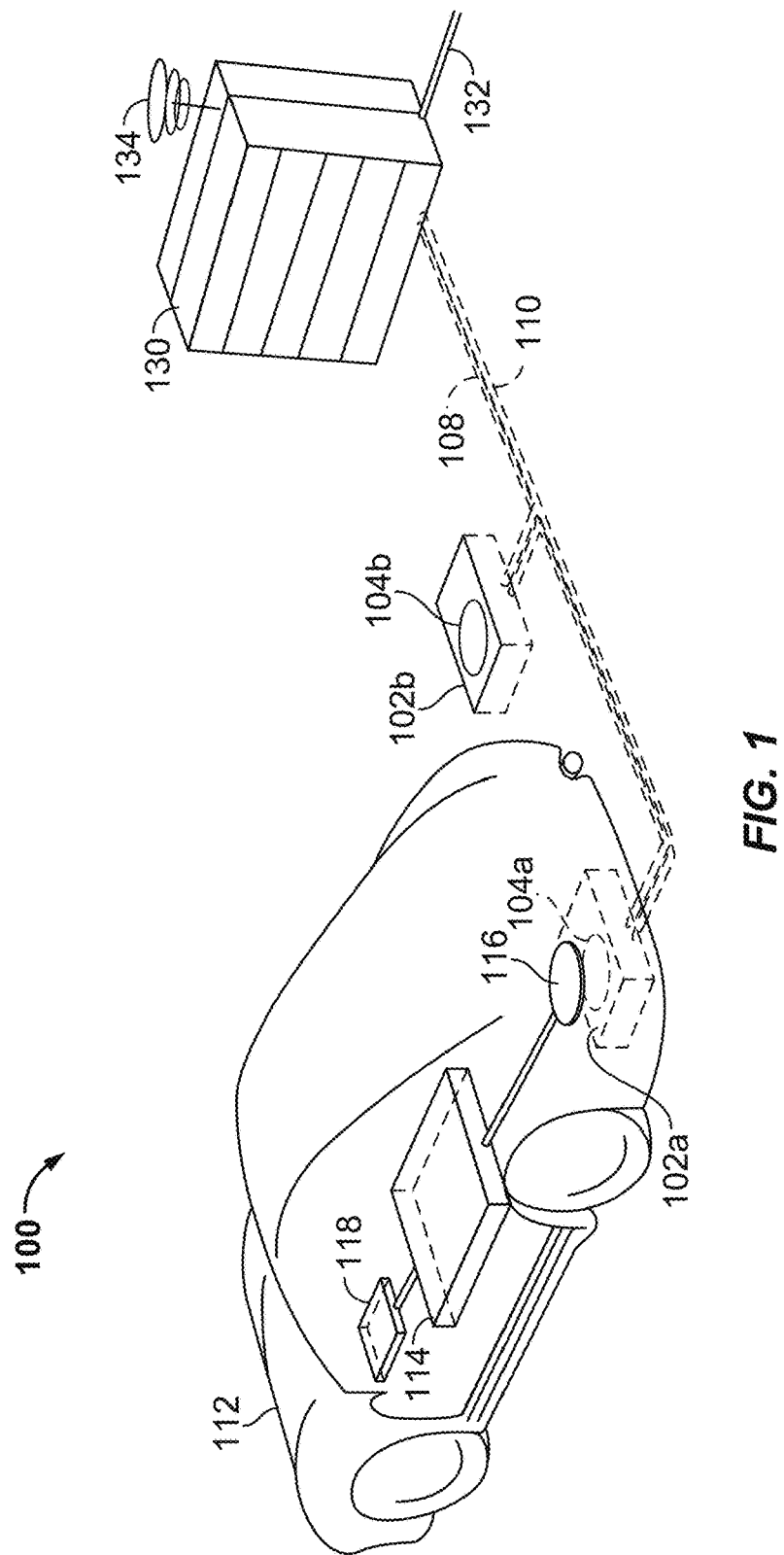
FIG. 1 is a diagram of an exemplary wireless power transfer system for charging an electric vehicle.

Referring to FIG. 1, a diagram of an exemplary wireless power transfer system 100 for charging an electric vehicle 112 is shown. The wireless power transfer system 100 enables charging of an electric vehicle 112 while the electric vehicle 112 is parked near a base wireless charging system 102*a*. Spaces for two electric vehicles are illustrated in a parking area to be parked over corresponding base wireless charging system 102a and 102b. In some embodiments, a local distribution center 130 may be connected to a power backbone 132 and configured to provide an alternating current (AC) or a direct current (DC) supply through a power link 110 to the base wireless charging system 102a. The base wireless charging system 102a and 102b also includes respective base system induction coils 104a and 104b for wirelessly transferring or receiving power. An electric vehicle 112 may include a battery unit 118, an electric vehicle induction coil 116, and an electric vehicle wireless charging system 114. The electric vehicle induction coil 116 may interact with the base system induction coil 104a for example, via a region of the electromagnetic field generated by the base system induction coil 104a. The base wireless charging system 102a, including the base system induction coil 104a, may be referred to as a base charging pad or a base pad. A base charging pad is an example of a wireless power transmitting apparatus. In an example, a base charging pad may be an assembly including a weather resistant housing configured to enclose and protect the base system induction coil 104a and other charging related components from environmental and operational elements (e.g., weather, UV exposure, traffic, etc.).

In some exemplary embodiments, the electric vehicle induction coil 116 may receive power when the electric vehicle induction coil 116 is located in an energy field produced by the base system induction coil 104a. The field corresponds to a region where energy output by the base system induction coil 104a may be captured by an electric vehicle induction coil 116. The electric vehicle induction coil 116 may be generally referred to as a vehicle charging pad or vehicle pad. A vehicle charging pad may include a housing assembly configured to protect the vehicle induction coil 116 from the operational environment. For example, the energy output by the base system induction coil 104a may be at a level sufficient to charge or power the electric vehicle 112. In some cases, the field may correspond to the "near field" of the base system induction coil 104a. The near-field may correspond to a region in which there are strong reactive fields resulting from the currents and charges in the base system induction coil 104a that do not radiate power away from the base system induction coil 104a. In some cases the near-field may correspond to a region that is within about ½π of wavelength of the base system induction coil 104a (and vice versa for the electric vehicle induction coil 116). The configurations of the base system induction coil 104a and the vehicle induction coil 116 may impact the efficiency of the power transfer. For example, different coil topologies may not be fully operable with one another, and may impact spatial alignment tolerances between the base and vehicle coils. Local distribution 130 may be configured to communicate with external sources (e.g., a power grid) via a communication backhaul 134, and with the base wireless charging system 102a via a communication link 108.

In some embodiments the electric vehicle induction coil 116 may be aligned with the base system induction coil 104a and, therefore, disposed within a near-field region simply by the driver positioning the electric vehicle 112 correctly relative to the base system induction coil 104a. In other embodiments, the driver may be given visual feedback, auditory feedback, or combinations thereof to determine when the electric vehicle 112 is properly placed for wireless power transfer. In yet other embodiments, the electric vehicle 112 may be positioned by an autopilot system, which may move the electric vehicle 112 back and forth (e.g., in zig-zag movements) until an alignment error has reached a tolerable value. This may be performed automatically and autonomously by the electric vehicle 112 without or with only minimal driver intervention provided that the electric vehicle 112 is equipped with a servo steering wheel, ultrasonic sensors, and intelligence to adjust the vehicle. In still other embodiments, the electric vehicle induction coil 116, the base system induction coil 104a, or a combination thereof may have functionality for displacing and moving the induction coils 116 and 104a relative to each other to more accurately orient them and develop more efficient coupling therebetween.

The base wireless charging system 102a may be located in a variety of locations. As non-limiting examples, some suitable locations include a parking area at a home of the electric vehicle 112 owner, parking areas reserved for electric vehicle wireless charging modeled after conventional petroleum-based filling stations, and parking lots at other locations such as shopping centers and places of employment.

Charging electric vehicles wirelessly may provide numerous benefits. For example, charging may be performed automatically, virtually without driver intervention and manipulations thereby improving convenience to a user. There may also be no exposed electrical contacts and no mechanical wear out, thereby improving reliability of the wireless power transfer system 100. Manipulations with cables and connectors may not be needed, and there may be no cables, plugs, or sockets that may be exposed to moisture and water in an outdoor environment, thereby improving safety. There may also be no sockets, cables, and plugs visible or accessible, thereby reducing potential vandalism of power charging devices. Further, since an electric vehicle 112 may be used as distributed storage devices to stabilize a power grid, a docking-to-grid solution may be used to increase availability of vehicles for Vehicle-to-Grid (V2G) operation.

A wireless power transfer system 100 as described with reference to FIG. 1 may also provide aesthetical and non-impedimental advantages. For example, there may be no charge columns and cables that may be impedimental for vehicles and/or pedestrians. A potential safety issue, however, may arise when metallic foreign objects are located in the near-field generated by the base system induction coil 104a or the vehicle induction coil 116 (e.g., in a V2G configuration). The magnetic energy in the near-field may be transformed into thermal energy within a metallic foreign object, thus creating a fire hazard.

Figure 2:
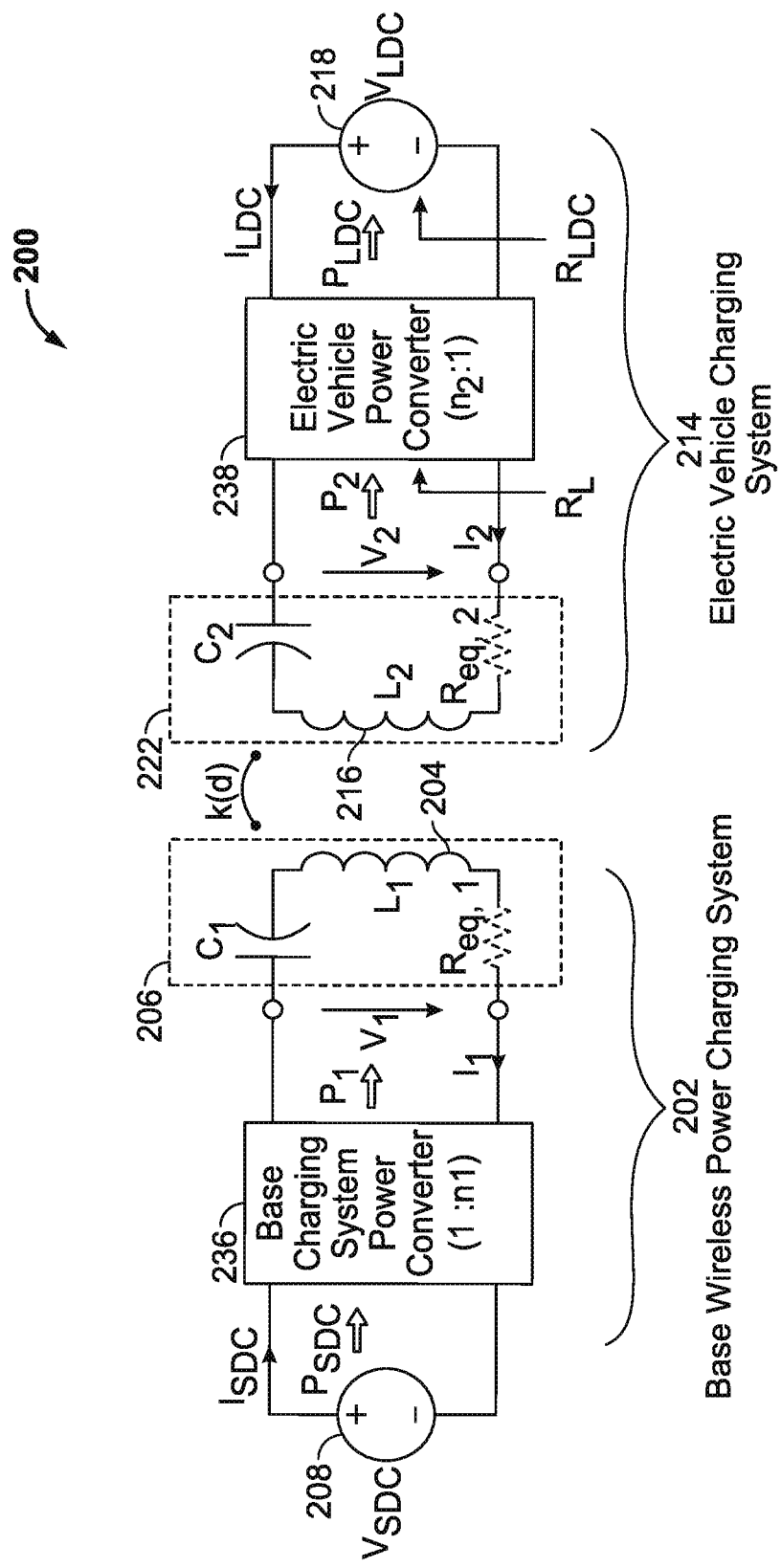
FIG. 2 is a schematic diagram of exemplary core components of the wireless power transfer system of FIG. 1.

Referring to FIG. 2, a schematic diagram of exemplary core components of the wireless power transfer system 100 of FIG. 1 is shown. The wireless power transfer system 200 may include a base system transmit circuit 206 including a base system induction coil 204 having an inductance L1. The wireless power transfer system 200 further includes an electric vehicle receive circuit 222 including an electric vehicle induction coil 216 having an inductance L2. Embodiments described herein may use capacitively loaded wire loops (i.e., multi-turn coils) forming a resonant structure that is capable of efficiently coupling energy from a primary structure (transmitter) to a secondary structure (receiver) via a magnetic or electromagnetic near field if both primary and secondary are tuned to a common resonant frequency. The coils may be used for the electric vehicle induction coil 216 and the base system induction coil 204. Using resonant structures for coupling energy may be referred to "magnetic coupled resonance," "electromagnetic coupled resonance," and/or "resonant induction." The operation of the wireless power transfer system 200 will be described based on power transfer from a base wireless power charging system 202 to an electric vehicle 112, but is not limited thereto. For example, as discussed above, the electric vehicle 112 may transfer power to the base wireless charging system 102a.

A power supply 208 (e.g., AC or DC) supplies power PSDC to the base wireless power charging system 202 to transfer energy to an electric vehicle 112. The base wireless power charging system 202 includes a base charging system power converter 236. The base charging system power converter 236 may include circuitry such as an AC/DC converter configured to convert power from standard mains AC to DC power at a suitable voltage level, and a DC/low frequency (LF) converter configured to convert DC power to power at an operating frequency suitable for wireless high power transfer. The base charging system power converter 236 supplies power P1 to the base system transmit circuit 206 including the capacitor C1 in series with the base system induction coil 204 to emit an electromagnetic field at a desired frequency. The capacitor C1 may be provided to form a resonant circuit with the base system induction coil 204 that resonates at a desired frequency. The base system induction coil 204 receives the power P1 and wirelessly transmits power at a level sufficient to charge or power the electric vehicle 112. For example, the power level provided wirelessly by the base system induction coil 204 may be on the order of kilowatts (kW) (e.g., anywhere from 1 kW to 110 kW or higher or lower).

The base system transmit circuit 206 including the base system induction coil 204 and electric vehicle receive circuit 222 including the electric vehicle induction coil 216 may be tuned to substantially the same frequencies and may be positioned within the near-field of an electromagnetic field transmitted by one of the base system induction coil 204 and the electric vehicle induction coil 116. In this case, the base system induction coil 204 and electric vehicle induction coil 116 may become coupled to one another such that power may be transferred to the electric vehicle receive circuit 222 including capacitor C2 and electric vehicle induction coil 116. The capacitor C2 may be provided to form a resonant circuit with the electric vehicle induction coil 216 that resonates at a desired frequency. Element k(d) represents the mutual coupling coefficient resulting at coil separation d. Equivalent resistances Req, 1 and Req, 2 represent the losses that may be inherent to the induction coils 204 and 216 and the anti-reactance capacitors C1 and C2. The electric vehicle receive circuit 222 including the electric vehicle induction coil 316 and capacitor C2 receives power P2 and provides the power P2 to an electric vehicle power converter 238 of an electric vehicle charging system 214.

The electric vehicle power converter 238 may include, among other things, a LF/DC converter configured to convert power at an operating frequency back to DC power at a voltage level matched to the voltage level of an electric vehicle battery unit 218. The electric vehicle power converter 238 may provide the converted power PLDC to charge the electric vehicle battery unit 218. The power supply 208, base charging system power converter 236, and base system induction coil 204 may be stationary and located at a variety of locations as discussed above. The battery unit 218, electric vehicle power converter 238, and electric vehicle induction coil 216 may be included in an electric vehicle charging system 214 that is part of electric vehicle 112 or part of the battery pack (not shown). The electric vehicle charging system 214 may also be configured to provide power wirelessly through the electric vehicle induction coil 216 to the base wireless power charging system 202 to feed power back to the grid. Each of the electric vehicle induction coil 216 and the base system induction coil 204 may act as transmit or receive induction coils based on the mode of operation.

While not shown, the wireless power transfer system 200 may include a load disconnect unit (LDU) to safely disconnect the electric vehicle battery unit 218 or the power supply 208 from the wireless power transfer system 200. For example, in case of an emergency or system failure, the LDU may be triggered to disconnect the load from the wireless power transfer system 200. The LDU may be provided in addition to a battery management system for managing charging to a battery, or it may be part of the battery management system.

Further, the electric vehicle charging system 214 may include switching circuitry (not shown) for selectively connecting and disconnecting the electric vehicle induction coil 216 to the electric vehicle power converter 238. Disconnecting the electric vehicle induction coil 216 may suspend charging and also may adjust the "load" as "seen" by the base wireless charging system 102a (acting as a transmitter), which may be used to "cloak" the electric vehicle wireless charging system 114 (acting as the receiver) from the base wireless charging system 102a. The load changes may be detected if the transmitter includes the load sensing circuit. Accordingly, the transmitter, such as a base wireless charging system 202, may have a mechanism for determining when receivers, such as an electric vehicle wireless charging system 114, are present in the near-field of the base system induction coil 204.

As described above, in operation, assuming energy transfer towards the vehicle or battery, input power is provided from the power supply 208 such that the base system induction coil 204 generates a field for providing the energy transfer. The electric vehicle induction coil 216 couples to the field and generates output power for storage or consumption by the electric vehicle 112. As described above, in some embodiments, the base system induction coil 204 and electric vehicle induction coil 116 are configured according to a mutual resonant relationship such that when the resonant frequency of the electric vehicle induction coil 116 and the resonant frequency of the base system induction coil 204 are very close or substantially the same. Transmission losses between the base wireless power charging system 202 and electric vehicle charging system 214 are minimal when the electric vehicle induction coil 216 is located in the near-field of the base system induction coil 204.

As stated, an efficient energy transfer occurs by coupling a large portion of the energy in the near field of a transmitting induction coil to a receiving induction coil rather than propagating most of the energy in an electromagnetic wave to the far-field. When in the near field, a coupling mode may be established between the transmit induction coil and the receive induction coil. The area around the induction coils where this near field coupling may occur is referred to herein as a near field coupling mode region.

While not shown, the base charging system power converter 236 and the electric vehicle power converter 238 may both include an oscillator, a driver circuit such as a power amplifier, a filter, and a matching circuit for efficient coupling with the wireless power induction coil. The oscillator may be configured to generate a desired frequency, which may be adjusted in response to an adjustment signal. The oscillator signal may be amplified by a power amplifier with an amplification amount responsive to control signals. The filter and matching circuit may be included to filter out harmonics or other unwanted frequencies and match the impedance of the power conversion module to the wireless power induction coil. The power converters 236 and 238 may also include a rectifier and switching circuitry to generate a suitable power output to charge the battery.

The electric vehicle induction coil 216 and base system induction coil 204 as described throughout the disclosed embodiments may also be referred to herein or be configured as "magnetic" antennas. The term "coil" generally refers to a component that may wirelessly output or receive energy for coupling to another "coil." The coil may also be referred to as an "antenna" of a type that is configured to wirelessly output or receive power. As used herein, coils 204 and 216 are examples of "power transfer components" of a type that are configured to wirelessly output, wirelessly receive, and/or wirelessly relay power. An air core coil may allow the placement of other components within the core area. Physical core coils including ferromagnetic or ferrimagnetic materials may allow development of a stronger electromagnetic field and improved coupling. The coils may be litz wire.

As discussed above, efficient transfer of energy between a transmitter and receiver occurs during matched or nearly matched resonance between a transmitter and a receiver. However, even when resonance between a transmitter and receiver are not matched, energy may be transferred at a lower efficiency. Transfer of energy occurs by coupling energy from the near field of the transmitting induction coil to the receiving induction coil residing within a region (e.g., within a predetermined frequency range of the resonant frequency, or within a predetermined distance of the near-field region) where this near field is established rather than propagating the energy from the transmitting induction coil into free space.

A resonant frequency may be based on the inductance and capacitance of a transmit circuit including an induction coil (e.g., the base system induction coil 204) as described above. Inductance may generally be the inductance of the induction coil, whereas, capacitance may be added to the induction coil to create a resonant structure at a desired resonant frequency. As a non-limiting example, as shown in FIG. 2, a capacitor may be added in series with the induction coil to create a resonant circuit (e.g., the base system transmit circuit 206) that generates an electromagnetic field. Accordingly, for larger diameter induction coils, the value of capacitance needed to induce resonance may decrease as the diameter or inductance of the coil increases. Inductance may also depend on a number of turns of an induction coil. Furthermore, as the diameter of the induction coil increases, the efficient energy transfer area of the near field may increase. Other resonant circuits are possible. As another non limiting example, a capacitor may be placed in parallel between the two terminals of the induction coil (e.g., a parallel resonant circuit). Furthermore an induction coil may be designed to have a high native quality (Q) factor to lower the losses of the induction coil and to increase efficiency of the inductive coupling system.

Figure 3:
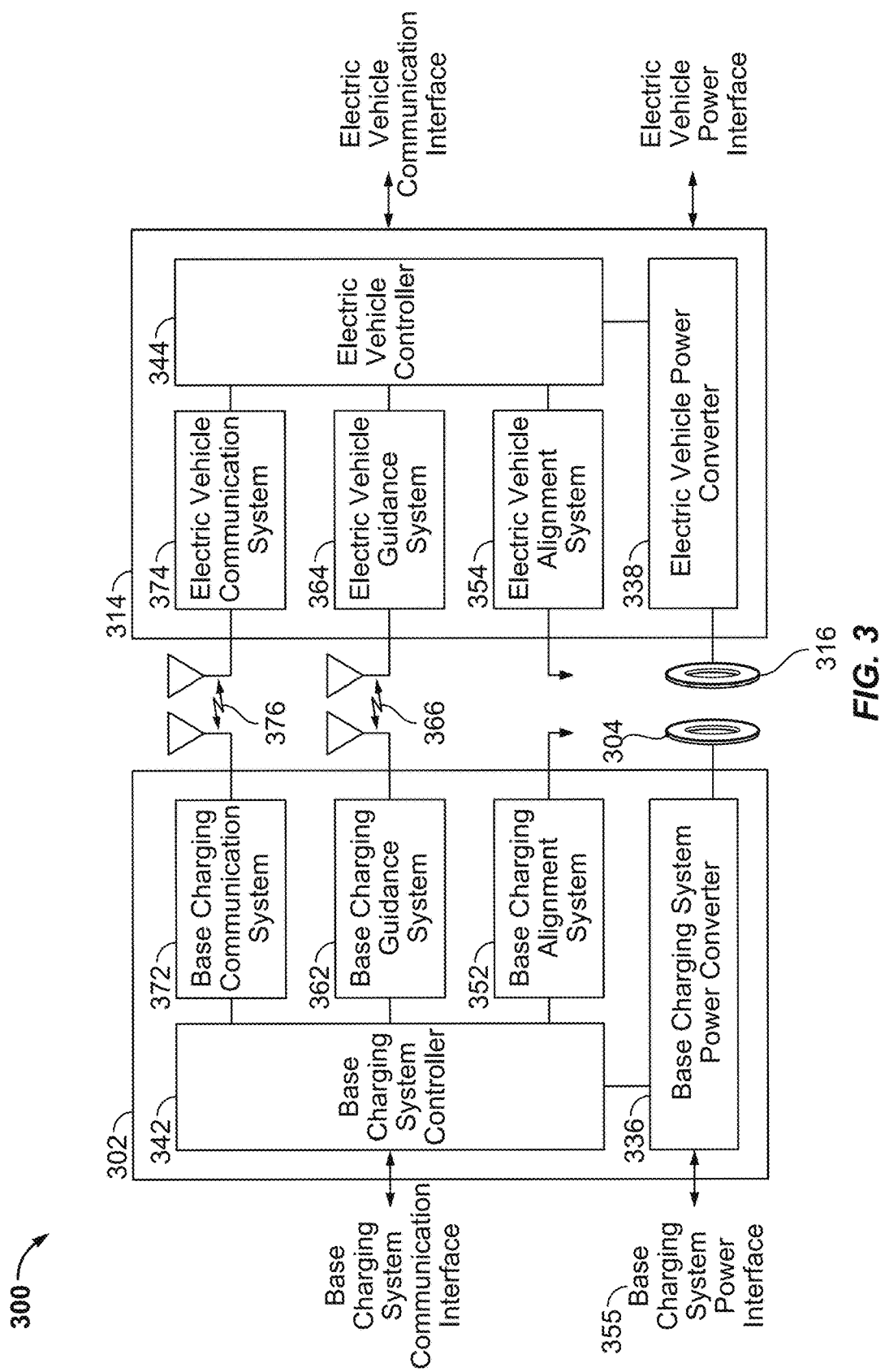
FIG. 3 is another functional block diagram showing exemplary core and ancillary components of the wireless power transfer system of FIG. 1.

Referring to FIG. 3, another functional block diagram showing exemplary core and ancillary components of the wireless power transfer system 300 of FIG. 1 is shown. The wireless power transfer system 300 illustrates a communication link 376, a guidance link 366, and alignment systems 352, 354 for the base system induction coil 304 and electric vehicle induction coil 316. As described above with reference to FIG. 2, and assuming energy flow towards the electric vehicle 112, in FIG. 3 a base charging system power interface 355 may be configured to provide power to a charging system power converter 336 from a power source, such as an AC or DC power supply. The base charging system power converter 336 may receive AC or DC power from the base charging system power interface 355 to excite the base system induction coil 304 at or near its resonant frequency. The electric vehicle induction coil 316, when in the near field coupling-mode region, may receive energy from the near field coupling mode region to oscillate at or near the resonant frequency. The electric vehicle power converter 338 converts the oscillating signal from the electric vehicle induction coil 316 to a power signal suitable for charging a battery via the electric vehicle power interface.

The base wireless power charging system 302 includes a base charging system controller 342 and the electric vehicle charging system 314 includes an electric vehicle controller 344. The base charging system controller 342 may include a base charging system communication interface to other systems (not shown) such as, for example, a computer, and a power distribution center, or a smart power grid. The electric vehicle controller 344 may include an electric vehicle communication interface to other systems (not shown) such as, for example, an on-board computer on the vehicle, other battery charging controller, other electronic systems within the vehicles, and remote electronic systems.

The base charging system controller 342 and electric vehicle controller 344 may include subsystems or modules for specific application with separate communication channels. These communications channels may be separate physical channels or separate logical channels. As non-limiting examples, a base charging alignment system 352 may communicate with an electric vehicle alignment system 354 through a communication link 376 to provide a feedback mechanism for more closely aligning the base system induction coil 304 and electric vehicle induction coil 316, either autonomously or with operator assistance. Similarly, a base charging guidance system 362 may communicate with an electric vehicle guidance system 364 through a guidance link to provide a feedback mechanism to guide an operator in aligning the base system induction coil 304 and electric vehicle induction coil 316. In addition, there may be separate general-purpose communication links (e.g., channels) supported by base charging communication system 372 and electric vehicle communication system 374 for communicating other information between the base wireless power charging system 302 and the electric vehicle charging system 314. This information may include information about electric vehicle characteristics, battery characteristics, charging status, and power capabilities of both the base wireless power charging system 302 and the electric vehicle charging system 314, foreign object detection information, as well as maintenance and diagnostic data for the electric vehicle 112. These communication channels may be separate physical communication channels such as, for example, Bluetooth, zigbee, cellular, etc.

Electric vehicle controller 344 may also include a battery management system (BMS) (not shown) that manages charge and discharge of the electric vehicle principal battery, a parking assistance system based on microwave or ultrasonic radar principles, a brake system configured to perform a semi-automatic parking operation, and a steering wheel servo system configured to assist with a largely automated parking 'park by wire' that may provide higher parking accuracy, thus reducing the need for mechanical horizontal induction coil alignment in any of the base wireless charging system 102*a* and the electric vehicle wireless charging system 114. Further, electric vehicle controller 344 may be configured to communicate with electronics of the electric vehicle 112. For example, electric vehicle controller 344 may be configured to communicate with visual output devices (e.g., a dashboard display), acoustic/audio output devices (e.g., buzzer, speakers), mechanical input devices (e.g., keyboard, touch screen, and pointing devices such as joystick, trackball, etc.), and audio input devices (e.g., microphone with electronic voice recognition).

Furthermore, the wireless power transfer system 300 may include detection and sensor systems. For example, the wireless power transfer system 300 may include sensors for use with systems to properly guide the driver or the vehicle to the charging spot, sensors to mutually align the induction coils with the required separation/coupling, sensors to detect objects that may obstruct the electric vehicle induction coil 316 from moving to a particular height and/or position to achieve coupling, and safety sensors for use with systems to perform a reliable, damage free, and safe operation of the system. For example, a safety sensor may include a sensor for detection of presence of animals or children approaching the wireless power induction coils 104a, 116 beyond a safety radius, detection of foreign metal objects near the base system induction coil 304 that may be heated up (induction heating), detection of hazardous events such as incandescent objects on the base system induction coil 304, and temperature monitoring of the base wireless power charging system 302 and electric vehicle charging system 314 components.

The wireless power transfer system 300 may also support plug-in charging via a wired connection. A wired charge port may integrate the outputs of the two different chargers prior to transferring power to or from the electric vehicle 112. Switching circuits may provide the functionality as needed to support both wireless charging and charging via a wired charge port.

To communicate between a base wireless power charging system 302 and an electric vehicle charging system 314, the wireless power transfer system 300 may use both in-band signaling and an RF data modem (e.g., Ethernet over radio in an unlicensed band). The out-of-band communication may provide sufficient bandwidth for the allocation of value-add services to the vehicle user/owner. A low depth amplitude or phase modulation of the wireless power carrier may serve as an in-band signaling system with minimal interference.

In addition, some communication may be performed via the wireless power link without using specific communications antennas. For example, the wireless power induction coils 304, 316 may also be configured to act as wireless communication transmitters. Thus, some embodiments of the base wireless power charging system 302 may include a controller (not shown) for enabling keying type protocol on the wireless power path. By keying the transmit power level (amplitude shift keying) at predefined intervals with a predefined protocol, the receiver may detect a serial communication from the transmitter. The base charging system power converter 336 may include a load sensing circuit (not shown) for detecting the presence or absence of active electric vehicle receivers in the vicinity of the near field generated by the base system induction coil 304. By way of example, a load sensing circuit monitors the current flowing to the power amplifier, which is affected by the presence or absence of active receivers in the vicinity of the near field generated by base system induction coil 104a. Detection of changes to the loading on the power amplifier may be monitored by the base charging system controller 342 for use in determining whether to enable the oscillator for transmitting energy, to communicate with an active receiver, or a combination thereof.

To enable wireless high power transfer, some embodiments may be configured to transfer power at a frequency in the range from 10-150 kHz and particularly in the range from 80-90 kHz. This low frequency coupling may allow highly efficient power conversion that may be achieved using solid state devices. In addition, there may be less coexistence issues with radio systems compared to other bands.

Figure 4:
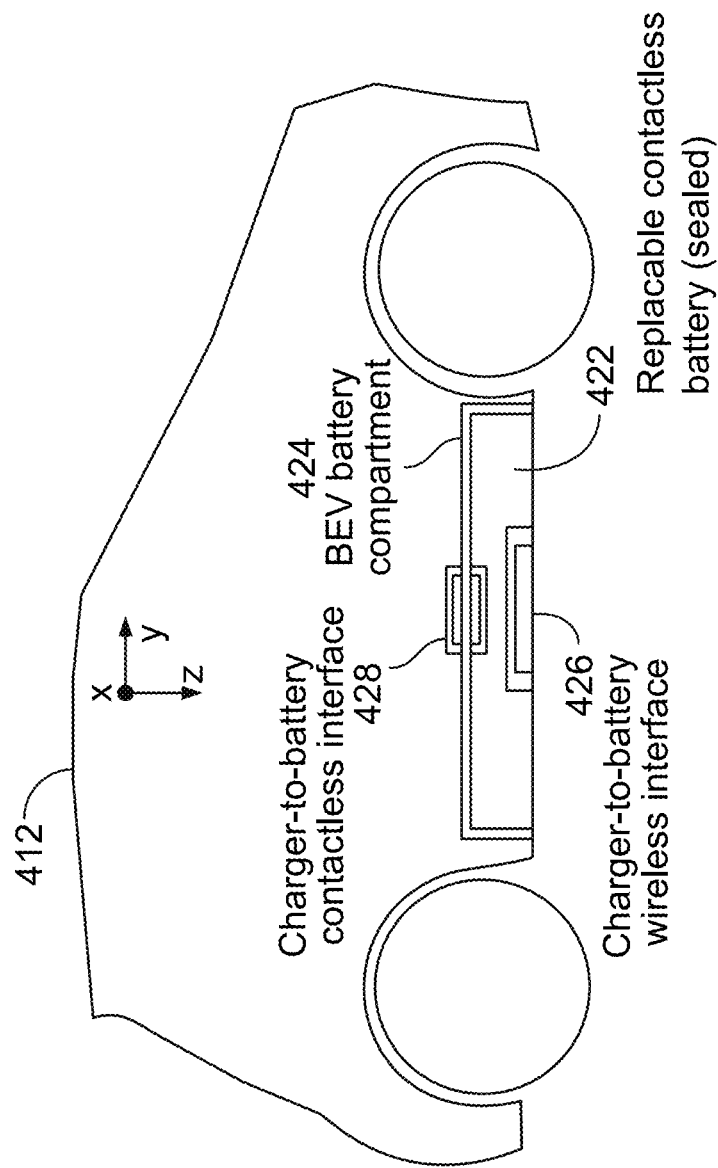
FIG. 4 is a functional block diagram showing a replaceable contactless battery disposed in an electric vehicle.

The wireless power transfer system 100 described may be used with a variety of electric vehicles 112 including rechargeable or replaceable batteries. FIG. 4 is a functional block diagram showing a replaceable contactless battery disposed in an electric vehicle 412, in accordance with an exemplary embodiment of the invention. In this embodiment, the low battery position may be useful for an electric vehicle battery unit that integrates a wireless power interface (e.g., a charger-to-battery wireless interface 426) and that may receive power from a charger (not shown) embedded in the ground. In FIG. 4, the electric vehicle battery unit may be a rechargeable battery unit, and may be accommodated in a battery compartment 424. The electric vehicle battery unit also provides a wireless power interface, which may integrate the entire electric vehicle wireless power subsystem including a resonant induction coil, power conversion circuitry, and other control and communications functions as needed for efficient and safe wireless energy transfer between a ground-based wireless charging unit and the electric vehicle battery unit.

It may be useful for the electric vehicle induction coil to be integrated flush with a bottom side of electric vehicle battery unit or the vehicle body so that there are no protrusive parts and so that the specified ground-to-vehicle body clearance may be maintained. This configuration may require some room in the electric vehicle battery unit dedicated to the electric vehicle wireless power subsystem. Variations in the design of the induction coil may impact the efficiency of the power transfer from the base charging pad. The addition of parasitic resonators as described herein may be used to improve power transfer efficiency. The electric vehicle battery unit 422 may also include a battery-to-EV contactless interface 428, and a charger-to-battery wireless interface 426 that provides wireless power and communication between the electric vehicle 412 and a base wireless charging system 102a as shown in FIG. 1.

In some embodiments, and with reference to FIG. 1, the base system induction coil 104a and the electric vehicle induction coil 116 may be in a fixed position and the induction coils are brought within a near-field coupling region by overall placement of the electric vehicle induction coil 116 relative to the base wireless charging system 102a. However, in order to perform energy transfer rapidly, efficiently, and safely, the distance between the base system induction coil 104a and the electric vehicle induction coil 116 may need to be reduced to improve coupling. Thus, in some embodiments, the base system induction coil 104a and/or the electric vehicle induction coil 116 may be deployable and/or moveable to bring them into better alignment. In an example, one or more parasitic coil structure(s) may be used to improve the coupling between the base system induction coil 104a and/or the electric vehicle induction coil 116.

Referring to FIGS. 5A and 5B, schematic diagrams of a cut view and a perspective view, respectively of a prior art charging pad based on a double-D coil structure 210 are shown. In general, the double-D coil structure 210 is configured to transmit or receive magnetic flux to or from a space beyond the structure, respectively. The double-D coil structure 210 comprises at least a first electrically conductive coil 220 and a second electrically conductive coil 230. The coils in double-D could structure 210 may be comprised of two separate coils (e.g., with two separate conductors), or a single conductor wound to form the double-D coils (e.g., a figure-eight winding). The first coil 220 is substantially a planar coil and has a first periphery bounding a first area. The second coil 230 is substantially a planar coil and has a second periphery bounding a second area. The second coil 230 is substantially coplanar with the first coil 220. In an embodiment, the double-D coil structure is disposed on a magnetically permeable material 240 having a substantially planar surface 242 and having a third periphery bounding a third area. The magnetically permeable material 240 is sometimes referred to herein as a "core." The magnetically permeable material 240 can be magnetically associated with at least the first coil 220 and the second coil 230. The first coil 220 and the second coil 230 are substantially parallel to the substantially planar surface 242. Furthermore, the magnetically permeable core may be disposed on a conductive back plate 250 e.g. made of aluminum. The conductive back plate is sometimes referred to herein as a "shield". As depicted in FIG. 5A, a core is not limited to center of a wire coil and may include a layer disposed proximately to a wire coil.

In the example structure shown in FIGS. 5A and 5B, the first coil 220 has a first periphery (e.g., D-shaped) bounding a first area, the second coil 230 has a second periphery (e.g., D-shaped) bounding a second area, the magnetically permeable material 240 has a third periphery bounding a third area, and a ratio of the sum of the first area and the second area to the third area is in a range between 0.9 and 1.1. For example, the sum of the first area and the second area can be substantially equal to the third area. One or more portions (e.g., substantially straight portions) of the first periphery can be substantially aligned with one or more portions (e.g., substantially straight portions) of the third periphery, and one or more portions (e.g., substantially straight portions) of the second periphery can be substantially aligned with one or more portions (e.g., substantially straight portions) of the third periphery. For example, an outer horizontal dimension of the sum of the first coil 220 and the second coil 230 (e.g., a first length across the double-D coils from a substantially straight portion of the first periphery to an opposite and substantially straight portion of the second periphery) can be substantially equal to an outer horizontal dimension of the magnetically permeable material 240 (e.g., a second length across the third periphery substantially parallel to the first length). Other portions of the first periphery and the second periphery (e.g., curved portions, such as the corners of the D-shaped periphery) can deviate from the third periphery, such that the sum of the first area and the second area can be less than the third area.

The optional magnetically permeable material 240 is a monolithic ferrite plate having the third periphery and the third area. In certain other configurations, the magnetically permeable material 240 can comprise multiple magnetically permeable portions (e.g., plates, rods, blocks, tiles). In some cases, the magnetically permeable portions are mechanically coupled to one another to form the magnetically permeable material 240. These multiple magnetically permeable portions can be at least partially spaced from one another. For example, the magnetically permeable material 240 can comprise at least one region within the third area, with the at least one region comprising a non-magnetic and non-conductive material (e.g., air, plastic). The at least one region can comprise multiple regions that are adjacent to one another, multiple regions that are separate from one another (e.g., separated by a ferrite material or an electrically conductive material), or multiple regions of both. The at least one region can have a summed area (e.g., sum of the areas of the at least one region) that is less than 20% of the third area.

Figure 6:
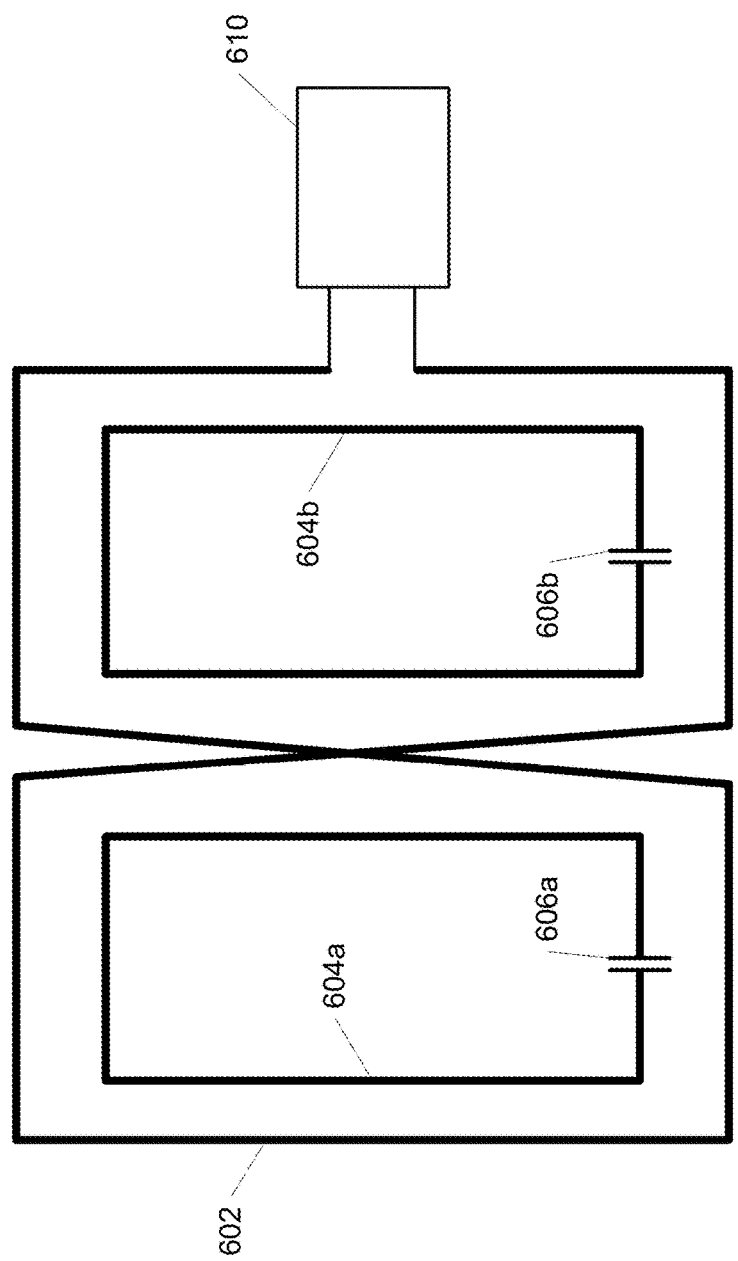
FIG. 6 is a schematic diagram of an active double-D coil with two parasitic circular resonators.

Referring to FIG. 6, a schematic diagram of a coil arrangement including an active double-D coil and two parasitic circular coils is shown. A double-D coil 602 may be as described in FIG. 5B with a first coil 220 and a second coil 230. It shall be noticed that FIG. 6 is a schematic diagram intended to show the basic topology of the coils rather than their real physical form (number of turns, coil width, thickness, etc.). It also does not show any magnetically permeable core and shielding structure, which may be associated with the coil arrangement, and which is previously described in connection with FIG. 5A-B. The double-D coil 602 may include one or more conductors wound in a figure-eight configuration and operable coupled to a transmitting unit 610. The use of the transmitting unit 610 is exemplary only and not a limitation, the coil arrangement may also apply to an electric vehicle charging pad where the actively receiving double-D coil is operationally connected to a receiving unit. A vehicle charging pad is an example of a wireless power receiving apparatus. Other winding configurations may be used such that the orientation and configuration of the double coils allows for generating magnetic flux passing through the coils. The interior conductors in a double-D coil (i.e., the sides of the coils that are adjacent to one another) are configured such that the current in each coil is flowing in the same direction relative to one another. This configuration of current flow means that the double-D coil 602 may generate magnetic flux substantially with a horizontal orientation (i.e., a horizontal magnetic flux direction). The transmitting unit 610 may be a base charging system power converter 236 including tuning and matching and configured to actively drive the double-D coil 602 (e.g., apply an AC voltage to case current to flow in the double-D coil 602). The actively driven double-D coil 602 is an example of a transmitting coil structure (e.g., when coupled to the transmitter 610) and includes a first circular coplanar parasitic coil 604a and a second circular coplanar parasitic coil 604b, each disposed within a respective area within the double-D coil as depicted in FIG. 6. The first circular coplanar coil 604a and the second circular coplanar parasitic coil 604b are galvanically isolated from one another and the double-D coil 602 (e.g., there is no conduction path between the elements). Each of the circular parasitic coils 604a-b may include one or more capacitive elements such as the first capacitive element 606a and the second capacitive element 606b. In general, the orientation and configuration of the circular parasitic coils 604a-b are sensitive to magnetic flux passing vertically through the coils (e.g., the circular parasitic coils have a substantially vertical magnetic flux orientation). The circular coplanar parasitic coils 604a-b including capacitive elements 606a-b form parasitic LC-resonators and may improve coupling efficiency in a wireless power link. For example, the parasitic resonators may boost performance in weak coupling conditions while their boost effect may diminish naturally in a strongly coupled regime. The impact on the coupling efficiency may enable wireless power transfer between different (non-matched) coil topologies (e.g., an active double-D coil in the base charging pad and an active circular coil in the electric vehicle charging pad). To make the parasitic resonators effective, it may require the wireless power transfer system to operate with an intentional alignment offset between the base charging pad and the electric vehicle charging pad e.g. an intentional horizontal offset in the direction of the orientation of the field generated by the active double-D coil. The parasitic coils 604a-b including capacitive elements 606a-b may be passive elements and may not require external connections or switches. In an example, the parasitic coils 604a-b may be disposed on one or more different planes relative to the double-D coil 602. The configuration of the double-D coil 602 and the circular parasitic coils 604a-b are examples only, and not a limitation, as other configurations may be used to improve the coupling efficiency.

Figure 7A:
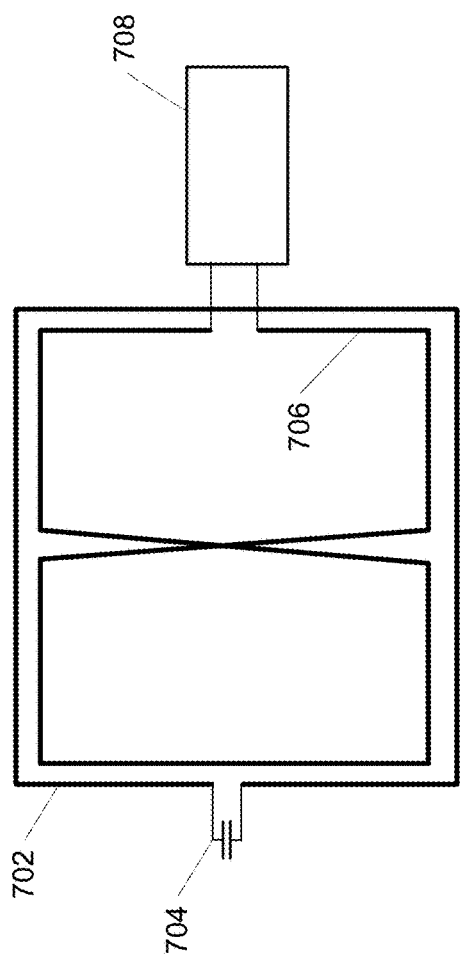
FIG. 7A is a schematic diagram of an active double-D coil with a parasitic circular resonator.
Figure 7C:
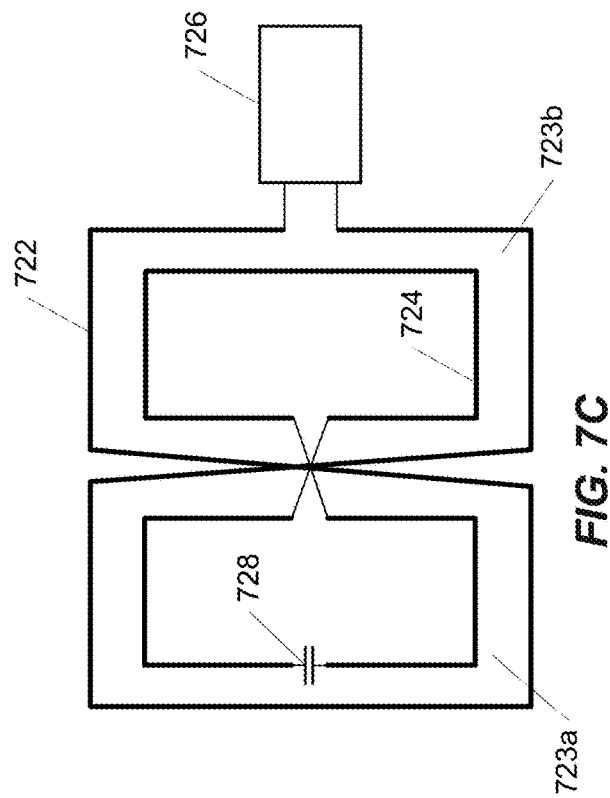
FIG. 7C is a schematic diagram of an active double-D coil with a parasitic double-D resonator.
Figure 7B:
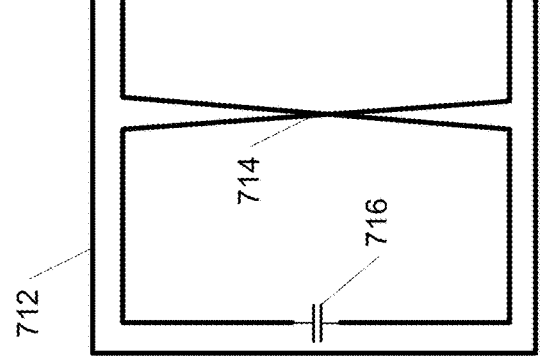
FIG. 7B is a schematic diagram of an active circular coil with a parasitic double-D resonator.

Referring to FIGS. 7A, 7B and 7C, schematic diagrams of exemplary configurations including active and parasitic coil structures are shown. Generally, the schematic diagrams represent different configurations for a base charging pad. The application of a base charging pad is exemplary only and not a limitation as the differing configurations may be utilized in an electric vehicle charging pad. FIGS. 7A, 7B and 7C intend to show the basic topology of the coils rather than their actual physical form (number of turns, coil width, thickness, etc.). FIG. 7A includes a parasitic circular coil 702 with a capacitive element 704 forming a parasitic LC-resonator, and an active double-D coil 706 operably coupled to a transmitting unit 708 including tuning and matching and configured to drive the active coil as previously described in connection with FIG. 6. FIG. 7B includes an active circular coil 712 disposed around a parasitic double-D coil 714 operably connected to a capacitive element 716. Active circular coil 712 is operably coupled to a transmitting unit 718. FIG. 7C includes an active double-D coil 722 coupled to a transmitting unit 726 and disposed around a parasitic double-D coil 724 operably connected to a capacitive element 728. The winding of the active double-D coil 722 creates a first area 723a and a second area 723b. The individual coils of the parasitic double-D coil 724 are disposed in the first area 723a and the second area 723b as depicted in FIG. 7C. The active coils 706, 712, 722 may also have one or more capacitive elements to form a resonant circuit. In each of the examples provided in FIGS. 6 and 7A-C the double-D and circular coils may be comprised of multiple windings of a single conductive wire such as Litz wire (e.g., a multi-turn coil). The respective double-D and circular coils may include 4, 8, 16, etc. turns around a coil holder or the coil windings may be embedded in a coil former that may be integrated in the plastic housing of the base charging pad. The double-D coils may be realized with figure-eight windings of a single conductor, or individual coils may be wound and placed adjoining one another. The individual coils may be wired such that the current direction in each of the coils replicates the current flow in a figure-eight winding (e.g., opposite directions in each coil) and the corresponding magnetic flux pattern. Other conductors and winding configurations may be used to create the active and parasitic coil configurations. In some implementations, the parasitic resonator is a capacitively loaded solenoid-type coil.

The respective pairs of active and parasitic coils are galvanically isolated from one another. The active and parasitic coils provided in FIGS. 6, and 7A-C are examples of a coil arrangements with a first coil structure and at least one second coil structure that is disposed adjacent to the first coil structure. As used herein, the term adjacent means in close proximity to or not distant. In other examples, the respective active and parasitic coils may be disposed on different planes (e.g., parallel or intersecting). The transmitting unit 708, 718, 726 may be the base charging system power converter 236 including tuning and matching and configured to actively drive the corresponding active coil. The frequency and power output from the transmit units 708, 718, 726 may vary based on operational requirements (e.g., power output, receiver configuration, coil dimensions). The capacitive elements 704, 716, 728 may be fixed passive elements (e.g., capacitors) to provide a fixed reactance. In an example, the capacitive elements 704, 716, 728 may include a plurality of passive or active elements (e.g., variable capacitors) configured to dynamically change the anti-reactance of the respective capacitive elements and thus the resonant frequency of the respective parasitic resonators. In some implementations, variable capacitance (or variable reactance) is realized using electronic circuitry e.g. a switch-controlled capacitor as described herein or similar techniques mimicking a capacitance. In other implementations, variable capacitance is realized using a bank of switched capacitors. Active capacitive elements may be operable coupled to a control system (not shown) and varied based on coupling strength, or other charging parameters, between the base charging pad and the electric vehicle charging pad.

Figure 8:
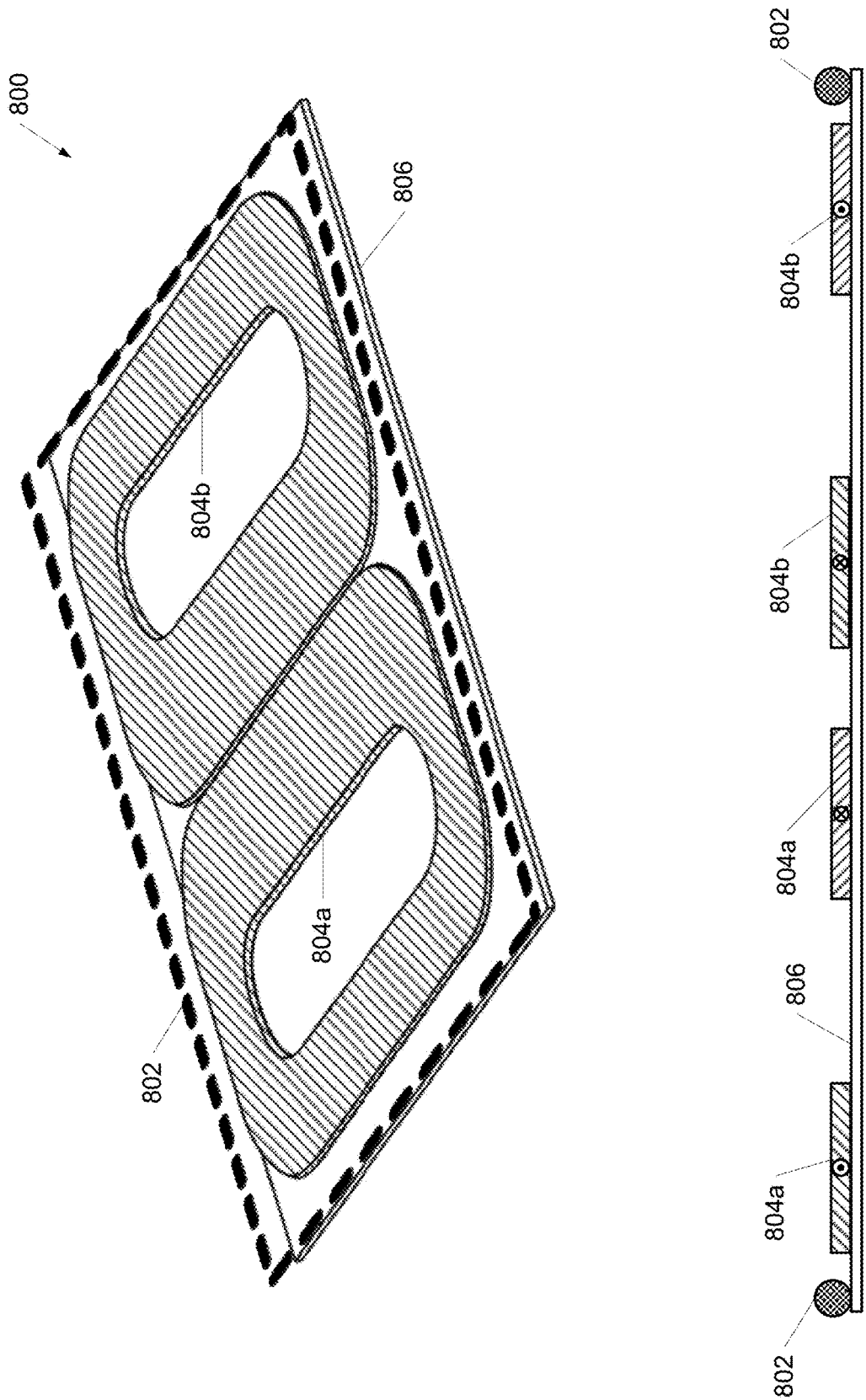
FIG. 8 is a schematic diagram including a cut view and a corresponding perspective view of an active double-D coil with a parasitic circular coil.

Referring to FIG. 8, with further reference to FIG. 7A, schematic diagrams of a cut view and a perspective view of a charging pad 800 (base charging pad or electric vehicle charging pad) with an active double-D coil and a coplanar parasitic circular coil are shown. The charging pad 800 includes a parasitic circular coil 802, a first active coil 804a, a second active coil 804b, and a mounting surface 806. The mounting surface 806 is an example of a first planar mounting surface. The parasitic circular coil 802 is disposed around, and is coplanar with, the first and second active coils 804a-b. The dimensions of the parasitic circular coil are at least sufficient to encircle the outside edges of the first active coil 804a and the second active coil 804b as depicted in FIG. 8. The coils 802, 804a-b may be comprised of Litz wire in multi-turn coils disposed on a non-conductive mounting surface 806. The mounting surface 806 is planar and may be made of plastic or other composite materials. The charging pad 800 may include a ferromagnetic core. In some implementations, the mounting surface 806 may be the surface of the ferromagnetic core as described in connection with FIG. 5A. In an example, the coils 802, 804a-b may be embedded in a protective housing assembly constructed with a non-conducting non-magnetic material. The housing assembly (not shown in FIG. 8) may be configured to secure the parasitic circular coil 802 and the first and second active coils 804a-b in a coplanar configuration. The horizontal distances between the parasitic circular coil 802 and the first and second active coils 804a-b may vary. In an example, the distance between the inside edge of the parasitic circular coil 802 and the outside edge of the first and second active coils 804a-b is between 5 and 50 millimeters. The charging pad 800 may also include a conductive shield (back plate) (not shown in FIG. 8) as previously described in connection with FIGS. 5A-B.

Figure 9:
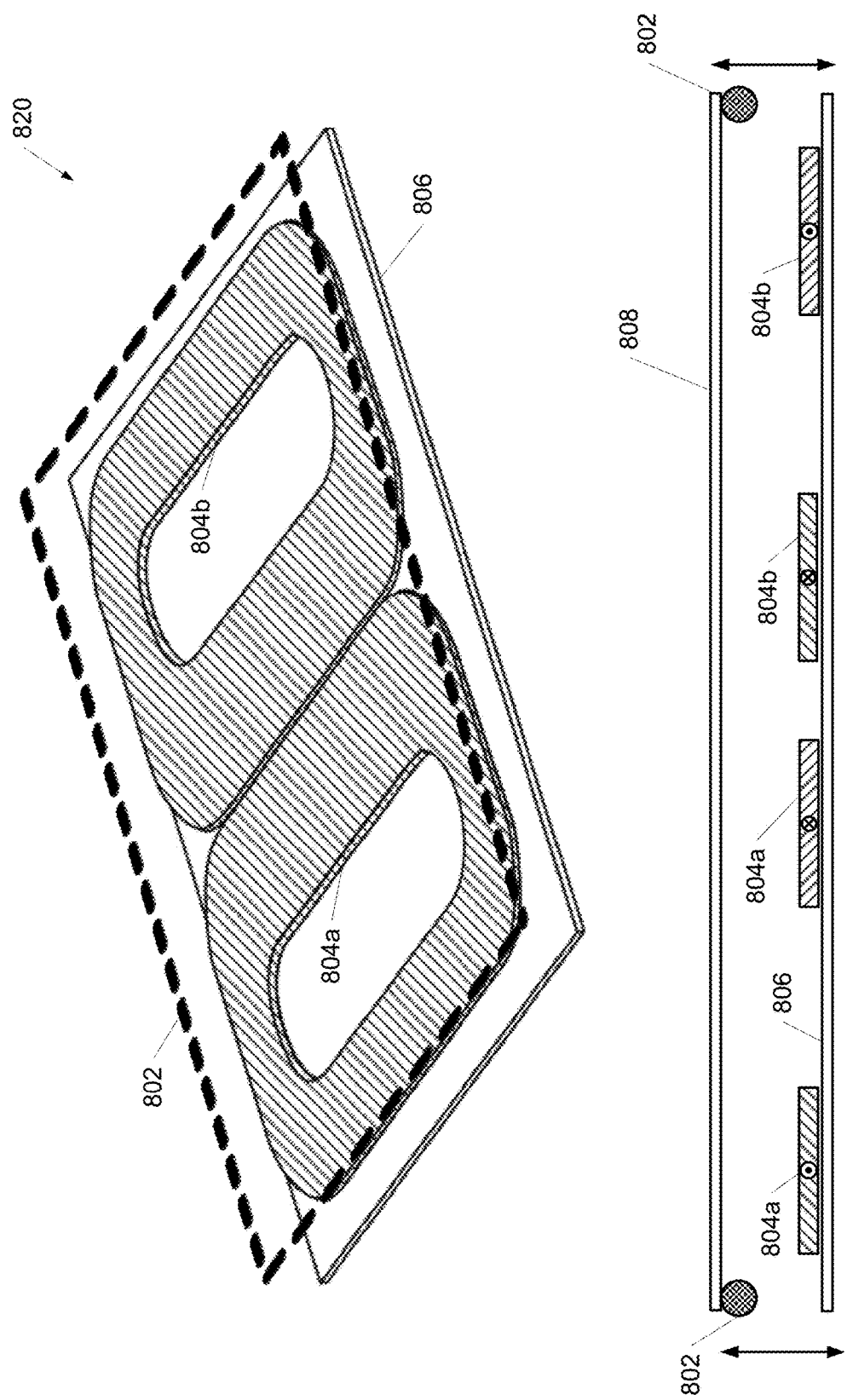
FIG. 9 is a schematic diagram including a cut view and a corresponding perspective view of an active double-D coil with a moveable parasitic circular coil.

Referring to FIG. 9, with further reference to FIG. 8, schematic diagrams of a cut view and a perspective view of charging pad 820 (base charging pad or electric vehicle charging pad) with an active double-D coil and a moveable parasitic circular coil are shown. The charging pad 820 includes the parasitic circular coil 802, the first active coil 804a, the second active coil 804b and the mounting surface 806 as described in FIG. 8. The parasitic circular coil 802 is disposed on a second planar mounting surface such as a non-conductive upper mounting assembly 808. The upper mounting assembly 808 is an example of a side planar mounting assembly. The upper mounting assembly 808 may be configured to move vertically in relation to the mounting surface 806, such that the parasitic circular coil 802 and the first and second active coils 804*a-b* are parallel. Other orientations between the coils may also be used. The relative position between the mounting surface 806 and the upper mounting assembly 808 may be maintained and/or adjusted by one or more mechanical devices such as brackets, standoffs, or other non-conducting fasteners. In an example, the vertical displacement (e.g., distance) between the parasitic circular coil 802 and the first and second active coils 804*a-b* may be maintained by a non-conductive (e.g., plastic) enclosure assembly for the charging pad 820. The distance and orientation between the parasitic and active coils may be used to adjust the magnetic flux pattern generated by the charging pad 820. In an example, the parasitic coil 802 may be connected to a capacitive element which is not disposed on the mounting assembly and is does not move with the parasitic coil 802. The parasitic effect of the parasitic circular coil 802 may be used to improve the coupling efficiency between matched and particularly between non-matched coil topologies e.g. an active circular coil in the base charging pad and an active double-D coil in the electric vehicle charging pad. For example, the parasitic circular coil 802 may be positioned relative to the first and second active coils 804*a-b* to improve the efficiency when a circular electric vehicle charging pad is position above a charging pad 820 that is a base charging pad. As previously noted, exploiting the parasitic effect may require the wireless power transfer system to operate with an intentional alignment offset between a base charging pad and an electric vehicle charging pad.

Figure 10:
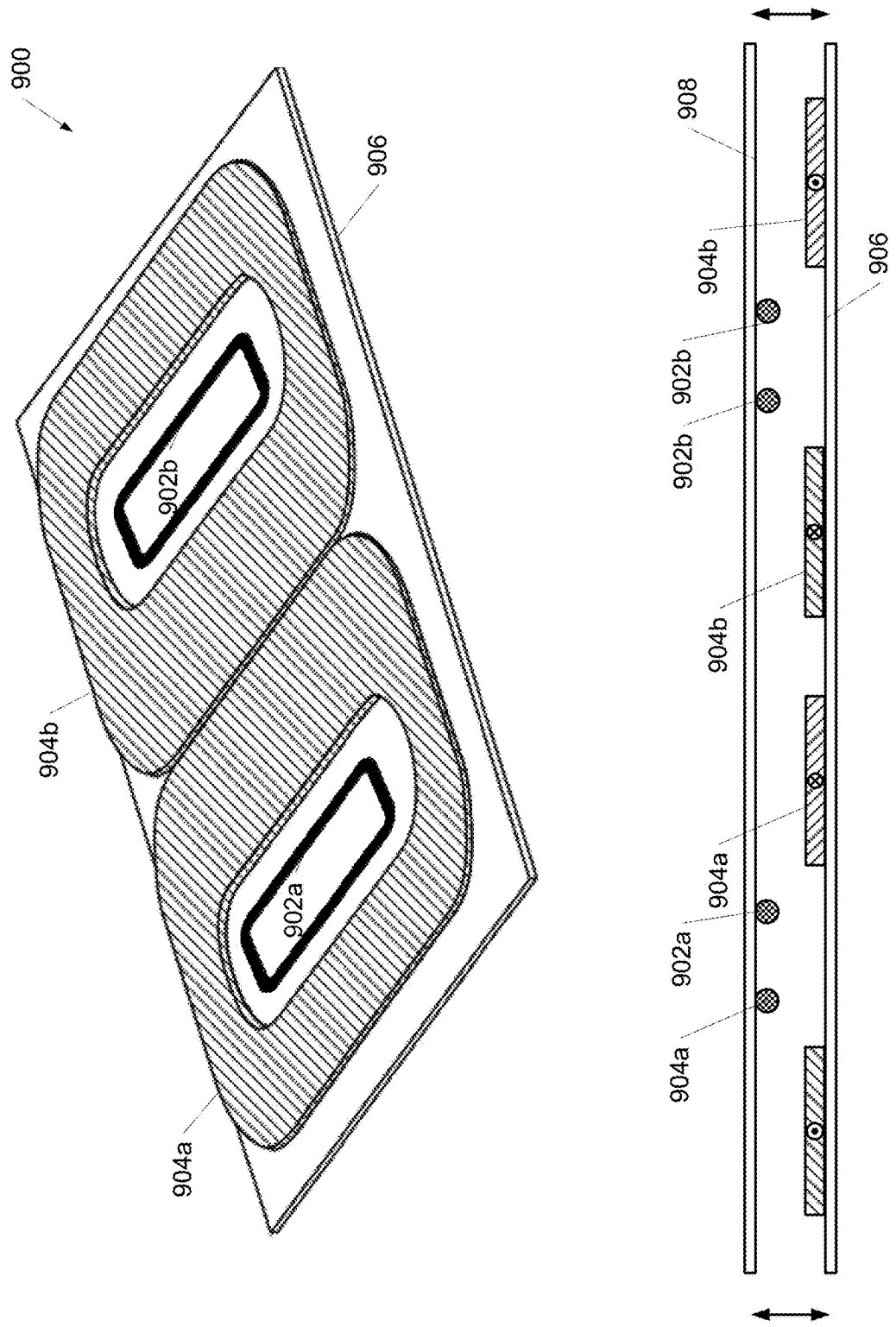
FIG. 10 is a schematic diagram including a cut view and a perspective view of an active double-D coil with moveable parasitic circular coils.

Referring to FIG. 10, with further reference to FIG. 6, schematic diagrams of a cut view and a perspective view of charging pad 900 with an active double-D coil with movable parasitic circular coils are shown. The charging pad 900 includes a first parasitic circular resonator 902*a* and a second parasitic circular resonator 902*b*. Each of the parasitic circular resonators 902*a-b* may also include capacitive elements (not shown in FIG. 10). The parasitic circular resonators 902*a-b* are disposed within the center of a respective first active coil 904*a* and a second active coil 904*b*. In an example, the active coils 904*a-b* are multi-turn coils wrapped around a nonconductive material (e.g., plastic) or are embedded in a nonconductive coil former as part of a pad enclosure. The active coils 904*a-b* may be affixed to, or otherwise mounted on a mounting surface 906, and the parasitic circular resonators 902*a-b* may be attached or integrated within an upper mounting assembly 908 as shown in FIG. 10. The relative positions of the mounting surface 906 and the upper mounting assembly 908 may be fixed (e.g., a rigid assembly), they may be configured to move relative to one another (e.g., adjustable assembly). In an example, the mounting surface 906 and the upper mounting assembly 908 may be configured to enable relative movement in one or more axis (e.g., surge, sway, heave, roll, pitch, yaw). The parasitic circular resonators 902*a-b* and the active coils 904*a-b* may be coplanar. In an example, the orientation of the respective active coils 904*a-b* and the parasitic circular resonators 902*a-b* may be adjusted along one or more axis to change the magnetic flux pattern generated by the charging pad 900. Other configurations of coils may be affixed, or otherwise integrated with, the mounting surface 906 and the upper mounting assembly 908. As an example, the upper mounting assembly 908 may include a parasitic double-D coil 724, and the mounting surface 906 may include an active double-D coil 722, such as described in FIG. 7C.

Figure 11:
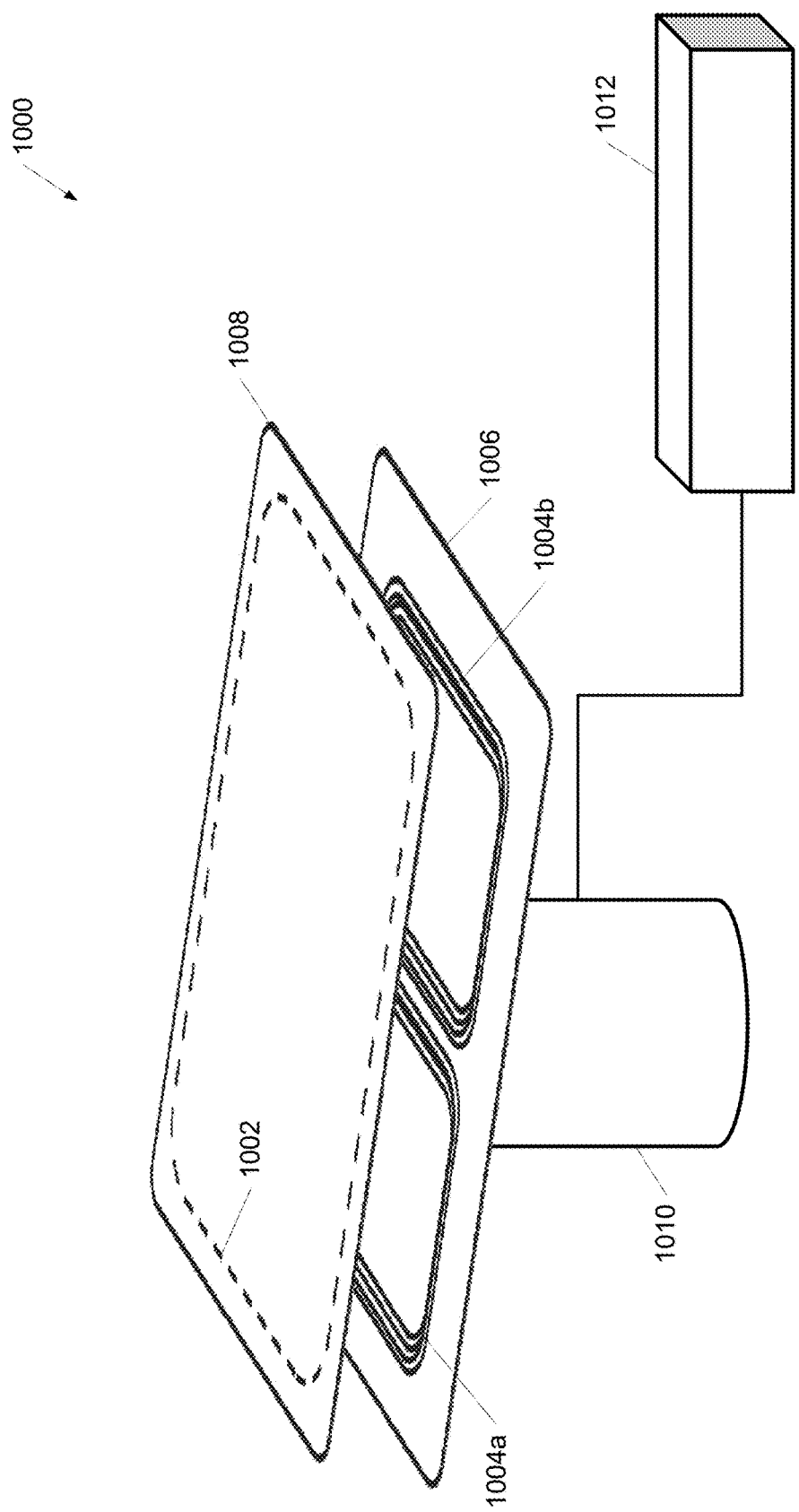
FIG. 11 is a block diagram of a dynamic base charging pad with movable double-D and circular coil assemblies.

Referring to FIG. 11, with further reference to FIG. 7A, a perspective diagram of an exemplary implementation of a dynamic base charging pad 1000 with configurable double-D and circular coil assemblies is shown. The dynamic base charging pad 1000 includes a parasitic circular coil 1002 affixed to an upper mounting assembly 1008, a double coil comprised of a first active coil 1004*a* and a second active coil 1004*b* disposed on a planar mounting surface 1006. The mounting surface 1006 is operably coupled to a positioning system 1010 and charge controller 1012. The charge controller 1012 may be included in the base wireless power charging system 302 and configured to provide signals to the positioning system 1010. This positioning functionality may be part of the base charging alignment system 352 of FIG. 3. In an example, the positioning system 1010 includes one or more actuators configured to change the position and/or orientation of the active double-D coils 1004*a-b* relative to the parasitic circular coil 1002. The positioning system 1010 may be configured to keep the active coils 1004*a-b* and the parasitic circular coil 1002 in a parallel orientation. The positioning system 1010 may be a six-axis manipulator configured to change position of the mounting surface 1006 relative to the upper mounting assembly (e.g., translation, rotation). In an example, the positioning system 1010 may include other manipulators such as one or more pneumatic, hydraulic, or non-metallic lead screw assemblies configured to change the relative orientations of the mounting surface 1006 and the upper mounting assembly 1008. In operation, the charge controller 1012 e.g. base charging system controller 342 of FIG. 3 is configured to adjust the relative positions of the parasitic and active coils based on charging parameters such as the electric vehicle charging pad configuration, offset direction/distance between the base charging pad and the electric vehicle charging pad, coupling strength, and other charging operation parameters. While the dynamic base charging pad 1000 is an example of a charging pad with active coils 1004*a-b*, the structure in FIG. 11 may be utilized as a receiver by configuring the coils 1004*a-b* to be part of a resonant structure configured wirelessly couple power via a field generated by a wireless power transmitter.

Figure 12:
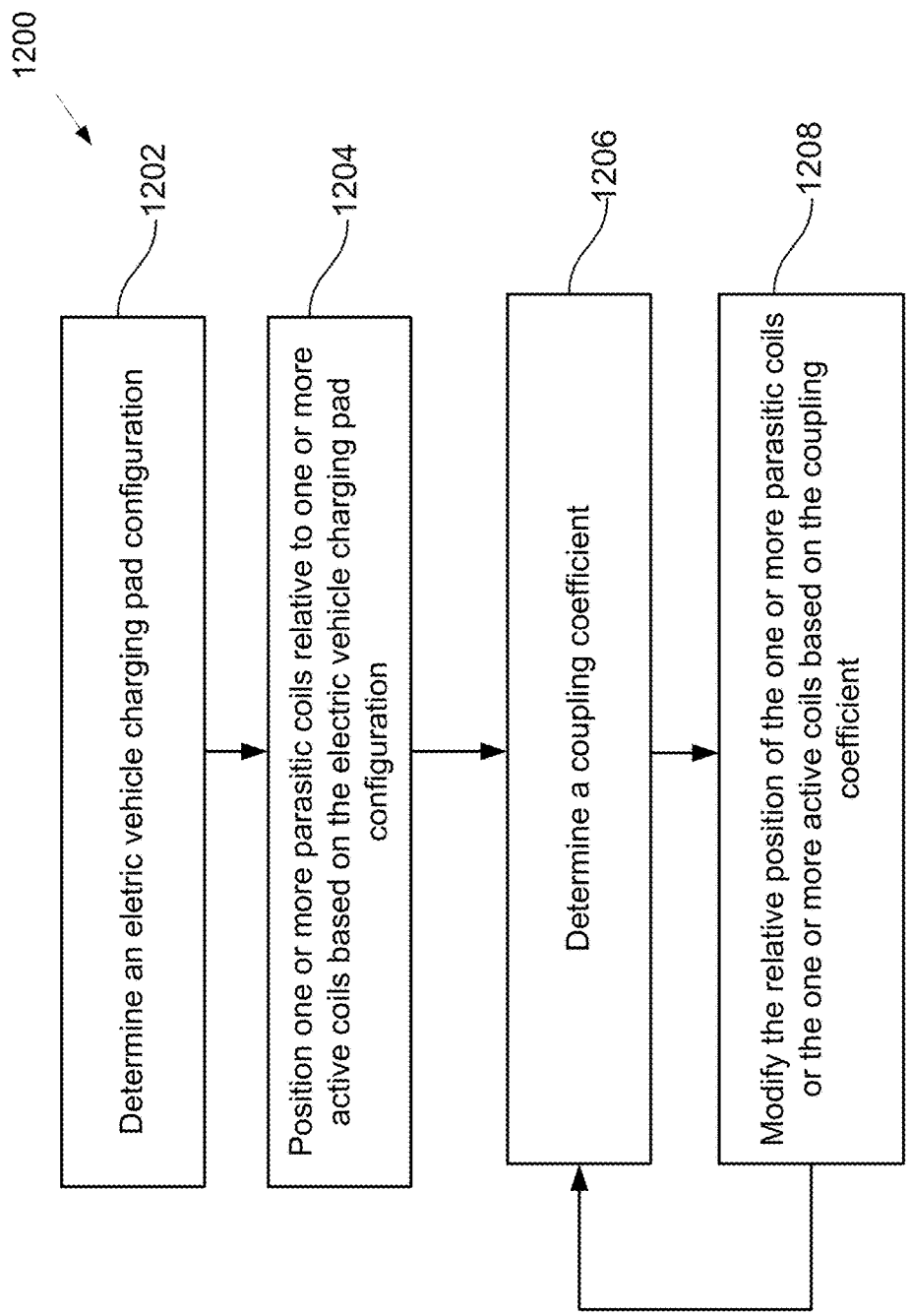
FIG. 12 is a process diagram for modifying the relative position between parasitic and active coils.

Referring to FIG. 12, with further reference to FIGS. 2, 3 and 9-11, a method 1200 for modifying the relative position between parasitic and active coils includes the stages shown. The method 1200, however, is exemplary only and not limiting. The method 1200 may be altered, e.g., by having stages added, removed, or rearranged.

At stage 1202, the method includes determining an electric vehicle charging pad configuration. The base charging system controller 342 may be a means to determine an electric vehicle charging pad configuration. The base charging communication system 372 may be configured to receive electric vehicle charging pad configuration information via the communication link 376. The electric vehicle charging pad configuration may indicate a general type or coil configuration (e.g., circular, solenoid, double-D), as well as more specific system information such as charging pad dimensions, offset values (e.g., a required intentional offset between base charging pad and electric vehicle charging pad), resonant frequencies, and other charge control parameters. Electric vehicle charging pad information may be stored in a local or remote database and the base charging system controller 342 may be configured to retrieve charging parameters based on the electric vehicle charging pad configuration. In an example, the base charging alignment system 352 may be configured to determine an offset value (e.g., x, y, z) to indicate the current relative position of the electric vehicle charging pad as compared to the base charging pad. The stored electric vehicle charging pad information may be associated with one or more offset values such that different charging parameters may be used for the same electric vehicle charging pad when the offset values are different.

At stage 1204, the method includes positioning one or more parasitic coils relative to one or more active coils based on the electric vehicle charging pad configuration. The base charging system controller 342 may be a means to position the one or more parasitic coils relative to one or more active coils based on the electric vehicle charging pad configuration. In general, the active coils and parasitic coils are disposed in a parallel configuration. In an embodiment, the active and parasitic coils may be positioned such that they are not parallel. Changing the relative positions of the coils impacts the magnetic flux generated from the base charging pad, and may increase the coupling with the electric vehicle charging pad. The relative positions may also be changed in view of the offset between the electric vehicle charging pad and the base charging pad. The base charging system controller 342 is configured to determine the initial positions of the active and parasitic coils based on the electric vehicle charging pad configuration information. The offset information may also be used. In an example, the initial positions may be retrieved from a database (e.g., look-up-tables). The controller 342 is configured to activate one or more actuators (e.g., the positioning system 1010) to place the active and parasitic coils in the determined relative positions.

At stage 1206, the method includes determining a coupling coefficient. The base charging system controller 342 may be a means to determine a coupling coefficient. The coupling coefficient is an indication of the efficiency of the wireless power transfer between the base charging pad and the electric vehicle charging pad (e.g., the coupling coefficient k). In an example, the coupling coefficient may be determined by measuring the voltage and/or current at points in the base wireless power charging system 202 and the electric vehicle charging system 214 such as the base induction coil 204 and the vehicle induction coil 216. It may be also measured at other suitable measuring points of the system e.g. across a voltage regulator, or at the load. Such system parameters may be monitored before, during, and/or after the relative positions of the active and parasitic coils are adjusted. For example, the initial position of a parasitic coil may be determined based on an electric vehicle charging pad configuration at stage 1202 and charging operations may commence based on the initial position. The coupling coefficient may be determined and evaluated based on a previously stored look-up table or other data source. The coupling coefficient is one example of a parameter indicative the efficiency of a wireless power transfer. Other parameters may also be used to model and monitor wireless power transfer efficiency.

At stage 1208, the method includes modifying the relative position of the one or more parasitic coils or the one or more active coils based on the coupling coefficient. The base charging system controller 342 may be a means to modify the relative position of the one or more parasitic coils or the one or more active coils based on the coupling coefficient. The coupling coefficient may be degraded due to the offset between the electric vehicle charging pad and the base charging pad, alignment issues, or other configuration differences between the electric vehicle charging pad and the base charging pad. The base charging system controller 342 may be configured to move the active or parasitic coils vertically, horizontally, or about another axis based on the coupling coefficient. The magnitude and direction of the modification may be based on previously stored parameters. The modifications may be performed iteratively by determining the coupling coefficient at stage 1206 and subsequently modifying the relative positions. In an example, the coupling coefficient may be within a threshold value and the relative positions of the coils will remain constant.

The various operations of methods described above may be performed by any suitable means capable of performing the operations, such as various hardware and/or software component(s), circuits, and/or module(s). Generally, any operations illustrated in the Figures may be performed by corresponding functional means capable of performing the operations.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative logical blocks, modules, circuits, and algorithm steps described in connection with the implementations disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. The described functionality may be implemented in varying ways for each particular application, but such implementation decisions should not be interpreted as causing a departure from the scope of the implementations.

The various illustrative blocks, modules, and circuits described in connection with the implementations disclosed herein may be implemented or performed with a general purpose processor, a Digital Signal Processor (DSP), an Application Specific Integrated Circuit (ASIC), a Field Programmable Gate Array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm and functions described in connection with the implementations disclosed herein may be embodied directly in hardware, in a software module executed by a processor, or in a combination of the two. If implemented in software, the functions may be stored on or transmitted over as one or more instructions or code on a tangible, non-transitory computer-readable medium. A software module may reside in Random Access Memory (RAM), flash memory, Read Only Memory (ROM), Electrically Programmable ROM (EPROM), Electrically Erasable Programmable ROM (EEPROM), registers, hard disk, a removable disk, a CD ROM, or any other form of storage medium known in the art. A storage medium is coupled to the processor such that the processor can read information from, and write information to, the storage medium. In the alternative, the storage medium may be integral to the processor. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer readable media. The processor and the storage medium may reside in an ASIC.

Plural instances may be provided for components, operations, or structures described herein as a single instance. Finally, boundaries between various components, operations, and data stores are somewhat arbitrary, and particular operations are illustrated in the context of specific illustrative configurations. Other allocations of functionality are envisioned and may fall within the scope of the inventive subject matter. In general, structures and functionality presented as separate components in the exemplary configurations may be implemented as a combined structure or component. Similarly, structures and functionality presented as a single component may be implemented as separate components. These and other variations, modifications, additions, and improvements may fall within the scope of the inventive subject matter.

As used herein, including in the claims, unless otherwise stated, a statement that a function or operation is "based on" an item or condition means that the function or operation is based on the stated item or condition and may be based on one or more items and/or conditions in addition to the stated item or condition.

For purposes of summarizing the disclosure, certain aspects, advantages and novel features have been described herein. It is to be understood that not necessarily all such advantages may be achieved in accordance with any particular implementation. Thus, one or more implementations achieves or optimizes one advantage or group of advantages as taught herein without necessarily achieving other advantages as may be taught or suggested herein.

Various modifications of the above described implementations will be readily apparent, and the generic principles defined herein may be applied to other implementations without departing from the spirit or scope of the application. Thus, the present application is not intended to be limited to the implementations shown herein but is to be accorded the widest scope consistent with the principles and novel features disclosed herein.

What is claimed is:

1. A wireless power transmitting apparatus for powering or charging an electric vehicle, wireless power transmitting apparatus comprising:
   a first coil structure;
   at least one second coil structure disposed adjacent to the first coil structure; and
   a transmitter operably and electrically connected to the first coil structure, wherein the transmitter is configured to provide an electrical signal to the first coil structure and wherein the at least one second coil structure is a parasitic coil structure, galvanically isolated from the first coil structure, and wherein at least one of the first coil structure and the at least one second coil structure is a double-D coil structure.

2. The wireless power transmitting apparatus of claim 1 wherein the first coil structure is a double-D coil structure.

3. The wireless power transmitting apparatus of claim 2 wherein the at least one second coil structure includes a first circular coplanar parasitic coil disposed in a first area within the double-D coil structure, and a second circular coplanar parasitic coil disposed in a second area within the double-D coil structure.

4. The wireless power transmitting apparatus of claim 3 wherein the first circular coplanar parasitic coil is electrically coupled to a first capacitive element, and the second circular coplanar parasitic coil is electrically coupled to a second capacitive element.

5. The wireless power transmitting apparatus of claim 2 wherein the at least one second coil structure includes a parasitic circular coil disposed around and coplanar with the double-D coil structure.

6. The wireless power transmitting apparatus of claim 5 wherein the parasitic circular coil is electrically coupled to a capacitive element.

7. The wireless power transmitting apparatus of claim 1 wherein the first coil structure includes a circular coil and the at least one second coil structure includes a parasitic double-D coil structure, wherein the circular coil is disposed around the parasitic double-D coil structure.

8. The wireless power transmitting apparatus of claim 7 wherein the parasitic double-D coil structure is electrically coupled to a capacitive element.

9. The wireless power transmitting apparatus of claim 1 wherein the first coil structure includes a double-D coil structure and the at least one second coil structure includes a parasitic double-D coil structure, wherein the parasitic double-D coil structure is disposed in a first area and a second area bounded by the first coil structure.

10. The wireless power transmitting apparatus of claim 9 wherein the parasitic double-D coil structure is electrically coupled to a capacitive element.

11. The wireless power transmitting apparatus of claim 1 wherein the first coil structure is a first planar coil and the at least one second coil structure is at least one second planar coil.

12. The wireless power transmitting apparatus of claim 11 wherein the first coil structure and the at least one second coil structure are coplanar.

13. The wireless power transmitting apparatus of claim 11 wherein the first coil structure is disposed in a first plane and the at least one second coil structure is disposed in a second plane, wherein the first plane and the second plane are different planes.

14. The wireless power transmitting apparatus of claim 11 wherein the first coil structure is disposed on a first planar mounting surface and the at least one second coil structure is disposed on a second planar mounting surface, wherein the first planar mounting surface and the second planar mounting surface are parallel.

15. The wireless power transmitting apparatus of claim 14 wherein the first planar mounting surface and the second planar mounting surface are mechanically adjustable and configured to allow an adjustable displacement between the first coil structure and the at least one second coil structure.

16. A wireless power receiving apparatus, comprising:
   a first coil structure;
   at least one second coil structure disposed adjacent to the first coil structure; and
   a receiver operably and electrically connected to the first coil structure, wherein the first coil structure and the receiver provide a resonant structure configured to wirelessly couple power via a field generated by a wireless power transmitting apparatus, and wherein the at least one second coil structure is a parasitic coil structure, galvanically isolated from the first coil structure, and wherein at least one of the first and the at least one second coil structure is a double-D coil structure.

17. The wireless power receiving apparatus of claim 16 wherein the first coil structure is a double-D coil.

18. The wireless power receiving apparatus of claim 17 wherein the at least one second coil structure includes a first circular coplanar parasitic coil disposed in a first area within the double-D coil, and a second circular coplanar parasitic coil disposed in a second area within the double-D coil.

19. The wireless power receiving apparatus of claim 17 wherein the at least one second coil structure includes a parasitic circular coil disposed around and coplanar with the double-D coil.

20. The wireless power receiving apparatus of claim 16 wherein the first coil structure includes a circular coil and the at least one second coil structure includes a parasitic double-D coil, wherein the circular coil is disposed around the parasitic double-D coil.

21. The wireless power receiving apparatus of claim 16 wherein the first coil structure includes a double-D coil and the at least one second coil structure includes a parasitic double-D coil, wherein the parasitic double-D coil is disposed a first area and a second area bounded by the first coil structure.

22. The wireless power receiving apparatus of claim 16 wherein the first coil structure and the at least one second coil structure are coplanar.

23. The wireless power receiving apparatus of claim 16 wherein the first coil structure and the at least one second coil structure are disposed in different planes.

24. The wireless power receiving apparatus of claim 16 wherein the first coil structure is disposed on a first planar mounting surface and the at least one second coil structure is deposed on a second planar mounting surface, wherein the first planar mounting surface and the second planar mounting surface are mechanically adjustable to allow a change in a relative position of the first coil structure and the at least one second coil structure.

25. A base charging pad in a wireless power transmitting apparatus, the base charging pad comprising:
   a planar mounting surface;
   a transmitting coil structure disposed on the planar mounting surface;
   a side planar mounting assembly disposed parallel to the planar mounting surface;
   at least one parasitic coil structure disposed on the side planar mounting assembly and galvanically isolated from the transmitting coil structure; and
   a transmitter operably and electrically connected to the transmitting coil structure, wherein the transmitter is configured to provide an electrical signal to the transmitting coil structure, wherein at least one of the transmitting coil structure and the at least one parasitic coil structure are in a double-D configuration.

26. A method for modifying a relative position of a parasitic coil in a wireless power transmitting apparatus, comprising:
   determining an electric vehicle charging pad configuration;
   positioning one or more parasitic coils of the wireless power transmitting apparatus relative to one or more active coils of the wireless power transmitting apparatus based on the electric vehicle charging pad configuration;
   determining a coupling coefficient; and
   modifying the relative position of the one or more parasitic coils of the wireless power transmitting apparatus relative to the one or more active coils of the wireless power transmitting apparatus based on the coupling coefficient.

27. The method of claim 26 wherein determining the electric vehicle charging pad configuration includes receiving an electric vehicle charging pad configuration information via a communication link.

28. The method of claim 27 wherein the electric vehicle charging pad configuration information indicates a coil configuration.

29. The method of claim 27 wherein the electric vehicle charging pad configuration information indicates an offset value.

30. The method of claim 26 wherein the one or more parasitic coils of the wireless power transmitting apparatus and the one or more active coils of the wireless power transmitting apparatus are positioned parallel to one another.

* * * * *